US012305871B2

(12) United States Patent
Gonzalez et al.

(10) Patent No.: US 12,305,871 B2
(45) Date of Patent: May 20, 2025

(54) HVAC CONTROLLER INCLUDING LEDs FOR ILLUMINATING A DISPLAY

(71) Applicant: RESIDEO LLC, Golden Valley, MN (US)

(72) Inventors: Ricardo Alonso Gonzalez, Chihuahua (MX); Karla Cristina Morales, Chihuahua (MX); Pablo David Del Castillo, Chihuahua (MX); Cesar Alejandro Arzate, Chihuahua (MX)

(73) Assignee: Resideo, LLC, Golden Valley, MN (US)

( * ) Notice: Subject to any disclaimer, the term of this patent is extended or adjusted under 35 U.S.C. 154(b) by 230 days.

(21) Appl. No.: 17/756,599

(22) PCT Filed: Dec. 4, 2020

(86) PCT No.: PCT/US2020/063286
§ 371 (c)(1),
(2) Date: May 27, 2022

(87) PCT Pub. No.: WO2021/113624
PCT Pub. Date: Jun. 10, 2021

(65) Prior Publication Data
US 2023/0003407 A1    Jan. 5, 2023

Related U.S. Application Data

(60) Provisional application No. 62/943,735, filed on Dec. 4, 2019.

(51) Int. Cl.
*F24F 11/523*    (2018.01)
*F24F 11/52*     (2018.01)
(Continued)

(52) U.S. Cl.
CPC ............ *F24F 11/523* (2018.01); *F24F 11/52* (2018.01); *F24F 11/65* (2018.01);
(Continued)

(58) Field of Classification Search
CPC .......... F24F 11/52; F24F 11/523; F24F 11/65; G05D 23/1905; H05B 45/20; H05B 47/105
See application file for complete search history.

(56) References Cited

U.S. PATENT DOCUMENTS

| 5,931,378 A | 8/1999 | Schramm |
|---|---|---|
| 10,013,861 B2 | 7/2018 | Fadell et al. |

(Continued)

FOREIGN PATENT DOCUMENTS

| DE | 29505606 U1 | 2/1996 |
|---|---|---|
| DE | 102012200785 A1 | 7/2013 |

(Continued)

*Primary Examiner* — Nitin Patel
*Assistant Examiner* — Cory A Almeida
(74) *Attorney, Agent, or Firm* — Greenberg Traurig, LLP; Ryan D. Sharp; David J. Dykeman

(57) ABSTRACT

In some examples, a device includes an analog display configured to indicate a current temperature and one or more temperature set Additionally, the device includes processing circuitry is configured to control a set of light-emitting diodes (LEDs) to emit one or more optical beams to reflect off of a projection ring onto the analog display. The one or more optical beams are a first color if the current temperature is lower than a set point temperature of the one or more set point temperatures. The one or more optical beams are a second color if the current temperature is greater than the set point temperature of the one or more set point temperatures.

20 Claims, 14 Drawing Sheets

(51) Int. Cl.
  *F24F 11/65* (2018.01)
  *G05D 23/19* (2006.01)
  *H05B 45/20* (2020.01)
  *H05B 47/105* (2020.01)

(52) U.S. Cl.
  CPC ....... *G05D 23/1905* (2013.01); *H05B 47/105* (2020.01); *H05B 45/20* (2020.01)

(56) References Cited

U.S. PATENT DOCUMENTS

2015/0159895 A1    6/2015    Quam et al.
2015/0308705 A1*  10/2015  Sloo ...................... F24F 11/523
                                                   700/276
2019/0145648 A1    5/2019    Sinha et al.

FOREIGN PATENT DOCUMENTS

EP           2884195 A1      6/2015
JP          2006242625 A  *  9/2006
JP          2009302004 A    12/2009

* cited by examiner

HVAC CONTROLLER INCLUDING LEDs FOR ILLUMINATING A DISPLAY

This application is a national stage entry of WO International Patent Application No. PCT/US2020/063286, filed 4 Dec. 2020, which claims the benefit of U.S. Provisional Patent Application No. 62/943,735, filed 4 Dec. 2019, the entire content of both being incorporated herein by reference.

TECHNICAL FIELD

The disclosure relates to heating, ventilation, and air condition (HVAC) systems and thermostats for buildings.

BACKGROUND

A heating, ventilation, and air conditioning (HVAC) controller can control a variety of devices such as a furnace, a heat pump including a geothermal heat pump, a boiler, air conditioning unit, forced air circulation, and other similar equipment to control the internal climate conditions of a building. In some examples, a thermostat can control different devices depending on the outside temperature, temperature inside the building, the time of day, and other factors.

SUMMARY

In general, this disclosure describes a heating, ventilation, and air conditioning (HVAC) controller including a display which can show a set point temperature for an area, a current temperature of the area, and one or more other parameters. In some examples, the HVAC controller may include an analog display including a set of markers and a pointer connected to an electrical motor. In some examples, the analog display may include one or more light-emitting diodes (LEDs) configured to project a circular "halo" onto the analog display of the HVAC controller. In some examples, the LEDs may change a color of the circular halo based on whether the HVAC controller is in a heating mode, a cooling mode, or a standby mode. For example, if the HVAC controller is in a heating mode, the LEDs may project a red halo onto the analog display. If the HVAC controller is in a cooling mode, the LEDs may project a blue halo onto the analog display.

In some examples, a device includes an analog display configured to indicate a current temperature and one or more temperature set points. Additionally, the device includes processing circuitry is configured to control a set of light-emitting diodes (LEDs) to emit one or more optical beams to reflect off of a projection ring onto the analog display. The one or more optical beams are a first color if the current temperature is lower than a set point temperature of the one or more set point temperatures. The one or more optical beams are a second color if the current temperature is greater than the set point temperature of the one or more set point temperatures.

In some examples, a method includes indicating, by an analog display, a current temperature and one or more temperature set points; and controlling, by processing circuitry, a set of light-emitting diodes (LEDs) to emit one or more optical beams to reflect off of a projection ring onto the analog display. The one or more optical beams are a first color if the current temperature is lower than a set point temperature of the one or more set point temperatures. The one or more optical beams are a second color if the current temperature is greater than the set point temperature of the one or more set point temperatures.

In some examples, A device includes an analog display configured to indicate a current temperature and one or more temperature set points. Additionally, the device includes processing circuitry configured to control a set of light-emitting diodes (LEDs) to emit one or more optical beams to reflect off of a projection ring onto the analog display. The one or more optical beams are a first color if the current temperature is lower than a set point temperature of the one or more set point temperatures. The one or more optical beams are a second color if the current temperature is greater than the set point temperature of the one or more set point temperatures.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

Figure 1:
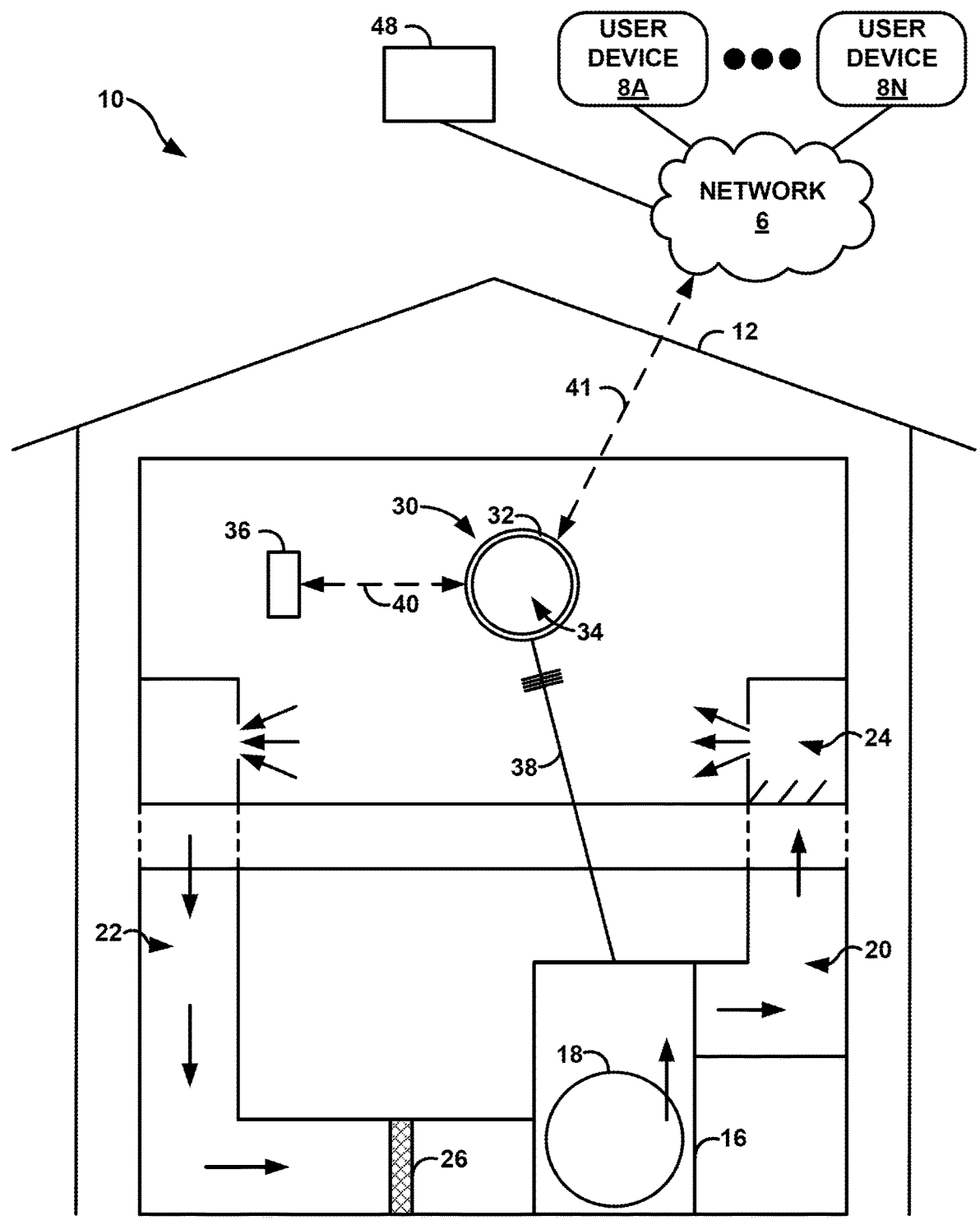
FIG. 1 is a block diagram illustrating an example heating, ventilation, and air conditioning (HVAC) system in a building, in accordance with one or more techniques described herein.

FIG. 1 is a block diagram illustrating an example heating, ventilation, and air conditioning (HVAC) system 10 in a building 12, in accordance with one or more techniques described herein. HVAC system 10 includes HVAC component(s) 16, a supply air duct 20, a return air duct 22 (collectively, "ducts 20, 22"), dampers 24, and air filters 26. Additionally, HVAC system 10 includes an HVAC controller 30 configured to control HVAC component(s) 16 to regulate one or more parameters within building 12. HVAC controller 30 may include a dial 32 and an analog display 34.

HVAC system 10 may include one or more devices for regulating an environment within building 12. For example, HVAC controller 30 may be configured to control the comfort level (e.g., temperature and/or humidity) in building 12 by activating and deactivating HVAC component(s) 16 in a controlled manner. HVAC controller 30 may be configured to control HVAC component(s) 16 via a wired or wireless communication link 38. In some examples, a wired communication link 38 may connect HVAC component(s) 16 and HVAC controller 30. HVAC controller 30 may be a thermostat, such as, for example, a wall mountable thermostat. In some examples, HVAC controller 30 may be programmable to allow for user-defined temperature set points to control the temperature of building 12. Based on sensed temperature of building 12, HVAC controller 30 may turn on HVAC component(s) 16 or turn off HVAC component(s) 16 in order to reach the user-defined temperature set point. Although this disclosure describes HVAC controller 30 (and controllers shown in other figures) as controlling HVAC component(s) 16, external computing device 36 may also be configured to perform these functions. The techniques of this disclosure will primarily be described using examples related to temperature, but the systems, devices, and methods described herein may also be used in conjunction with other sensed properties, such as humidity or air quality. In some examples, HVAC controller 30 may be configured to control all of the critical networks of a building, including a security system.

HVAC component(s) 16 may provide heated air (and/or cooled air) via the ductwork throughout the building 12. As illustrated, HVAC component(s) 16 may be in fluid communication with one or more spaces, rooms, and/or zones in building 12 via ducts 20, 22, but this is not required. In operation, when HVAC controller 30 outputs a heat call signal to HVAC component(s) 16, HVAC component(s) 16 (e.g., a forced warm air furnace) may turn on (begin operating or activate) to supply heated air to one or more spaces within building 12 via supply air ducts 20. HVAC component(s) 16, which include an air movement device 18 (e.g., a blower or a fan), can force the heated air through supply air duct 20. In this example, cooler air from each space returns to HVAC component(s) 16 (e.g. forced warm air furnace) for heating via return air ducts 22. Similarly, when a cool call signal is provided by HVAC controller 30, a cooling device (e.g., an air conditioning (AC) unit) of HVAC component(s) 16 may turn on to supply cooled air to one or more spaces within building 12 via supply air ducts 20. Air movement device 18 may force the cooled air through supply air duct 20. In this example, warmer air from each space of building 12 may return to HVAC component(s) 16 for cooling via return air ducts 22.

In some examples, HVAC component(s) 16 may include any one or combination of a fan, a blower, a furnace, a heat pump, an electric heat pump, a geothermal heat pump, an electric heating unit, an AC unit, a humidifier, a dehumidifier, an air exchanger, an air cleaner, a damper, a valve, and a fan, however this is not required. HVAC component(s) 16 may include any device or group of devices which contributes to regulating the environment within building 12 based on signals received from HVAC controller 30 or contributes to regulating the environment within building 12 independently from HVAC controller 30.

Ducts 20, 22 may include one or more dampers 24 to regulate the flow of air, but this is not required. For example, one or more dampers 24 may be coupled to HVAC controller 30 and can be coordinated with the operation of HVAC component(s) 16. HVAC controller 30 may actuate dampers 24 to an open position, a closed position, and/or a partially open position to modulate the flow of air from the one or more HVAC components to an appropriate room and/or space in building 12. Dampers 24 may be particularly useful in zoned HVAC systems, and may be used to control which space(s) in building 12 receive conditioned air and/or receives how much conditioned air from HVAC component(s) 16.

In many instances, air filters 26 may be used to remove dust and other pollutants from the air inside building 12. In the example shown in FIG. 1, air filters 26 is installed in return air duct 22 and may filter the air prior to the air entering HVAC component(s) 16, but it is contemplated that any other suitable location for air filters 26 may be used. The presence of air filters 26 may not only improve the indoor air quality but may also protect the HVAC component(s) 16 from dust and other particulate matter that would otherwise be permitted to enter HVAC component(s) 16.

HVAC controller 30 may include any suitable arrangement of hardware, software, firmware, or any combination thereof. For example, HVAC controller 30 may include processing circuitry comprising microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, the processing circuitry may include any suitable structure, whether in hardware, software, firmware, or any combination thereof, to perform the functions ascribed herein to HVAC controller 30.

Although not shown in FIG. 1, HVAC controller 30 may include a memory configured to store information within HVAC controller 30 during operation. The memory may include a computer-readable storage medium or computer-readable storage device. In some examples, the memory includes one or more of a short-term memory or a long-term memory. The memory may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, the memory is used to store program instructions for execution by the processing circuitry of HVAC controller 30. In some examples, the memory of HVAC controller 30 may be able to store data to and read data from memory included in external computing device 36 and/or memory included in external database 48. The memory may be used for storing network settings such as an Internet Protocol (IP) address and/or a Media Access Control (MAC) address of HVAC controller 30, external computing device 36, and/or a router.

In some examples, HVAC controller 30 may include a set of wire terminals which make up a terminal block (e.g., a wall plate or a terminal plate) for receiving a set of control wires for one or more HVAC component(s) 16 of HVAC system 10. The memory of HVAC controller 30 may store one or more wiring configurations for HVAC component(s) 16, allowing HVAC controller 30 to determine which of HVAC component(s) 16 are connected to HVAC controller 30. The memory of HVAC controller 30 may also store settings for HVAC system 10 which correspond to the one or more wiring configurations for HVAC component(s) 16. For example, if HVAC controller 30 is wired to an AC unit of HVAC component(s) 16, HVAC controller 30 may determine one or more settings for controlling the AC unit to turn on and turn off.

In some examples, the memory of HVAC controller 30 may store program instructions, which may include one or more program modules, which are executable by HVAC controller 30. When executed by HVAC controller 30, such program instructions may cause HVAC controller 30 to provide the functionality ascribed to it herein. The program instructions may be embodied in software, firmware, and/or RAMware.

In some examples, HVAC controller 30 may include a dial 32 which is located at an outer circumference of HVAC controller 30. HVAC controller 30 may be fixed to a wall or another surface such that dial 32 may be rotated relative to one or more other components (e.g., analog display 34) of HVAC controller 30. Dial 32 may represent a user interface such that processing circuitry of HVAC controller 30 may receive, dial 32 and/or dial circuitry electrically connected to dial 32, information indicative of a user input. In some examples, the user input may represent a user selection of a set point parameter value (e.g., a set point temperature), a user selection of information to be displayed by HVAC controller 30, or a user selection of another setting. In some examples, dial 32 may smoothly rotate with respect to analog display 34. In some examples, dial 32 may rotate with one or more steps such that as dial 32 rotates, dial 32 "snaps" into position after every interval of rotational distance. In some examples, dial 32 may smoothly rotate with respect to analog display 34 and HVAC controller 30 may output an audio signal (e.g., a clicking noise) for every interval of rotational position (e.g., every one degree) in which dial 32 rotates.

In some examples, dial 32 does not move inwards in response to a force applied to dial 32. For example, dial 32 may rotate about a center axis which passes through a center of dial 32 without moving along the center axis in response to one or more forces applied to dial 32. When HVAC controller 30 is mounted on a vertical surface such as a wall, HVAC controller 30 may prevent dial 32 from depressing inwards towards the vertical surface while allowing the dial 32 to rotate.

In some examples, dial 32 may include a set of light-emitting diodes (LEDs) configured to illuminate a portion or a whole of dial 32, but this is not required. The processing circuitry of HVAC controller 30 may selectively illuminate one or more LEDs of the set of LEDs in order to indicate a set point temperature or convey other information. In some examples, the set of LEDs included in dial 32 may illuminate dial 32 to indicate that HVAC system 10 is in a heating or indicate that HVAC system 10 is cooling. For example, when HVAC system 10 is heating (e.g., HVAC controller 30 is outputting one or more instructions for HVAC component(s) 16 to increase a temperature within building 12), the LEDs of dial 32 cause dial 32 to illuminate at a first color. When HVAC system 10 is cooling (e.g., HVAC controller 30 is outputting one or more instructions for HVAC component(s) 16 to decrease a temperature within building 12), the LEDs of dial 32 cause dial 32 to illuminate at a second color. In this way, the LEDs of dial 32 may indicate whether HVAC system 10 is heating or cooling.

Analog display 34 may include information relating to one or more aspects of an area in which HVAC controller 30 is located (e.g., a room in which HVAC controller 30 is located, a building in which HVAC controller 30 is located, an area outside of a building in which HVAC controller 30 is located, or any combination thereof). Analog display 34 may be round in shape and analog display 34 may be located an area within a circumference of dial 32 such that edges of dial 32 are visible around an outer circumference of analog display 34. At least part of dial 32 and analog display 34 may represent an outer surface of HVAC controller 30. In some cases, HVAC controller 30 may receive user input to one or both of dial 32 and analog display 34.

A user may interact with HVAC controller 30 through a mobile phone, a tablet, a computer, or another device. For example, user devices 8A-8N (collectively, "user devices 8") may communicate with HVAC controller 30 via network 6. HVAC controller 30 may, in some examples, be configured to communicate directly with network 6 without communicating with network 6 via a gateway device (e.g., a Wi-Fi router) within building 12. In some examples, HVAC controller 30 may receive instructions from one or more of user devices 8. The instructions may include, for example, a request to change a set point temperature for an area within building 12. HVAC controller 30 may change the set point temperature in response to receiving the instruction. In turn, HVAC controller 30 may control HVAC component(s) 16 to control the temperature within building 12 to reach the new set point.

In some examples, responsive to detecting a rotation of dial 32 while HVAC controller 30 is in the idle state, HVAC controller 30 transitions out of the idle state to a set point state. HVAC controller 30 may change a temperature set point for an area within building 12 in response to detecting the rotation of dial 32. In other words, HVAC controller 30 may determine that a rotation of dial 32 while HVAC controller 30 is in the idle state represents a user request to change a temperature set point. In transitioning out of the idle state, the processing circuitry of HVAC controller 30 may display the temperature set point for the area within building 12 on analog display 34. Additionally, HVAC controller 30 may display the temperature set point changing as dial 32 rotates. For example, the analog display 34 may show the temperature set point cycle through a range of degrees, where each change from one degree to another degree is reflected on analog display 34. In some examples, HVAC controller 30 may emit a noise each time the temperature set point changes from one degree value to another degree value. The noise may represent a clicking noise, a tapping noise, or another type of noise.

In some examples, HVAC controller 30 may control HVAC components 16 based on more than one set point. For example, HVAC controller 30 may determine whether one or both of a first set point mode and a second set point mode is activated. In some examples, the first set point mode represents a cooling temperature set point mode and the second set point mode represents a heating set point mode. In the cooling set point mode, the HVAC controller 30 may be configured to change a cooling set point, and in the heating set point mode, the HVAC controller 30 may be configured to change a heating set point. A cooling set point may represent a temperature set point for controlling HVAC components 16 to decrease or maintain a temperature within building 12 as compared with a temperature outside of building 12. A heating set point may represent a temperature set point for controlling HVAC components 16 to increase or maintain a temperature within building 12 as compared with a temperature outside of building 12.

In some examples, HVAC controller 30 is configured to receive user input representing an instruction to enter the first set point mode. In some examples, HVAC controller 30 is configured to receive user input representing an instruction to enter the second set point mode. HVAC controller 30 may enter the second set point mode in response to receiving user input representing a request to enter the second set point mode. For example, HVAC controller 30 may deactivate the first set point mode and activate the second set point mode in response to receiving information indicative of a user input to a mode button representing a request to enter the second set point mode. Alternatively, HVAC controller 30 may enter the first set point mode in response to receiving user input representing a request to enter the first set point mode. For example, HVAC controller 30 may deactivate the second set point mode in response to receiving information indicative of a user input to a mode button representing a request to enter the first set point mode.

HVAC controller 30 is configured to cause, based on the first set point mode being activated, the first set point of the device to change in response to receiving a rotation input to dial 32. Additionally, HVAC controller 30 is configured to cause, based on the second set point mode being activated, the second set point of the device to change in response to receiving a rotation input to dial 32. In this way, HVAC controller 30 may control one or both of the first set point and the second set point to change based on a rotation input to dial 32.

In some examples, analog display 34 includes a set of markers, an electric motor, and a pointer connected to the electric motor. In some examples, analog display 34 is circular in shape. The set of markers may be arranged in a "fan" shape, such that the markers are spaced along a circumference of analog display 34. In some examples, one or more of the markers may be labelled with a temperature value such that each marker of the set of markers corresponds to a temperature value. HVAC controller 30 may be configured to control the electric motor in order to "point" the pointer at the set of markers to indicate a temperature value. For example, HVAC controller 30 may be configured to control the electric motor in order to cause the pointer to indicate a first marker of the set of markers, wherein the first marker corresponds to a current temperature value. In some examples, HVAC controller 30 includes a temperature sensor. HVAC controller 30 may control the electric motor to align the pointer with the first marker based on the information indicative of the current parameter value. In some examples the electric motor represents a stepper motor.

Additionally, or alternatively, HVAC controller 30 may be configured to control dial 32 to indicate a temperature set point by indicating a second marker of the set of markers which corresponds to the temperature set point. In this way, it may be possible to observe the temperature set point and the current temperature value in relationship to each other on the same set of markers. Dial 32 may include a set of LEDs.

In some examples, to control dial 32 to indicate the temperature set point, HVAC controller 30 may control the set of LEDs to indicate the second marker. HVAC controller 30 may indicate the second marker by illuminating an LED of the set of LEDs which is proximate to the second marker. In some examples, HVAC controller 30 may cause one or more LEDs proximate to the second marker to emit light that is a different color than light emitted by other LEDs on the dial. In any case, HVAC controller 30 may control the one or more LEDs to indicate the second marker. HVAC controller 30 may control the electric motor in order to align the pointer with the first marker of the set of markers. That is, the pointer points at the first marker and the set of LEDs on the dial indicate the second marker.

In some examples, HVAC controller 30 includes a temperature sensor. HVAC controller 30 may control the electric motor to align the pointer with the first marker based on the information indicative of the current temperature value. HVAC controller 30 may control the pointer to indicate the current temperature value in real time or near real time. That is, HVAC controller 30 may move the pointer in response to a change in the current temperature.

In some examples, HVAC controller 30 includes a projection ring and a top plate. The projection ring and the top plate may be located at a center of analog display 34 such that a central axis passes through a center point of the projection ring and a center point of the top plate, the center axis being perpendicular to a face of analog display 34. In some examples, the projection ring includes a top surface, a bottom surface, and a rounded surface. The pointer may be located on top of the projection ring, and the center plaint may be located on top of the projection ring and the pointer.

In some examples, HVAC controller receives a rotation input to dial 32. The rotation input may be a clockwise rotation input or a counter-clockwise rotation input. In some examples, when dial 32 receives the rotation input, the HVAC controller 30 is in a set point change mode. In this case, HVAC controller 30 may change one or more temperature set points based on receiving the rotation input. HVAC controller 30 may control the set of LEDs of dial 32 to indicate a marker of the set of markers based on the change in the temperature set point. For example, HVAC controller 30 may control the set of LEDs of dial 32 to update the marker of the set of markers indicated by the LEDs in response to receiving the rotation input. Alternatively, HVAC controller 30 may receive, from a user device of devices 8, a user selection of a temperature set point. HVAC controller may control the set of LEDs of dial 32 to indicate the second marker based on the user selection of the set point parameter value. In this way, HVAC controller 30 may control the temperature set points based on user selections via dial 32 and/or user selections via a wireless connection 41 to user devices 8.

Dial 32 may include dial circuitry that is configured to generate an electrical signal indicative of a rotation of dial 32. That is, HVAC controller 30 may be configured to determine any one or combination of a rotational position of dial 32, a rotational displacement of dial 32, and a rotational velocity of dial 32 based in the electrical signal generated by the dial circuitry.

HVAC controller 30 may include a communication device (not illustrated in FIG. 1) to allow HVAC controller 30 to communicate via a wired or wireless connection 40 to external computing device 36. The communication device may include a Bluetooth transmitter and receiver, a Wi-Fi transmitter and receiver, a Zigbee transceiver, a near-field communication transceiver, or other circuitry configured to allow HVAC controller 30 to communicate with external computing device 36. In some examples, the communication device may allow HVAC controller 30 to exchange data with external computing device 36. Examples of exchanged data include a desired temperature for building 12, HVAC component(s) 16 connected to HVAC controller 30, error codes, geographic location, estimated energy usage and cost, and/or other operating parameters or system performance characteristics for HVAC system 10.

HVAC controller 30 may communicate via wired or wireless connection 40 with external computing device 36. External computing device 36 may be, include, or otherwise be used in combination with a mobile phone, smartphone, tablet computer, personal computer, desktop computer, personal digital assistant, router, modem, remote server or cloud computing device, and/or related device allowing HVAC controller 30 to communicate over a communication network such as, for example, the Internet or other wired or wireless connection. Communicating via the wired or wireless connection 40 may allow HVAC controller 30 to be configured, controlled, or otherwise exchange data with external computing device 36. In some examples, HVAC controller 30 communicating via wired or wireless connection 40 may allow a user to set up HVAC controller 30 when first installing the controller in building 12. In some examples, HVAC controller 30 and external computing device 36 communicate through a wireless network device such as a router or a switch. In other examples, HVAC controller 30 and external computing device 36 communicate through a wired connection such as an ethernet port, USB connection, or other wired communication network.

HVAC controller 30 may, via the communication device, communicate via a wired or wireless connection 41 with external database 48. In some examples, wired or wireless connection 41 enables HVAC controller 30 to communicate with external database 48 via a wireless connection which includes a network device such as a router, ethernet port, or switch. HVAC controller 30 and external database 48 may also communicate through a wired connection such as an ethernet port, USB connection, or other wired communication network. Communicating via the wired or wireless connection 41 may allow HVAC controller 30 to exchange data with external database 48. As such, external database 48 may be at a location outside of building 12. In some examples, external database 48 may be, include, or otherwise be used in combination with a remote server, cloud computing device, or network of controllers configured to communicate with each other. For example, HVAC controller 30 may receive data from HVAC controllers in nearby buildings through the internet or other city- or wide-area network. HVAC controller 30 may include the onboard database because it is unable to communicate via the communication device.

In some examples, external database 48 may be, or otherwise be included in, or accessed via, external computing device 36 (e.g., smartphone, mobile phone, tablet computer, personal computer, etc.). For example, HVAC controller 30 may communicate via a Wi-Fi network connection with a smartphone device to exchange data with external database 48. By communicating via wired or wireless connection 41, HVAC controller 30 may exchange data with external database 48.

In some examples, HVAC controller 30 may display a setpoint as a bright white light at moving around a perimeter of HVAC controller 30. As dial 32 rotates, the light may move with dial 32 to show a selected setpoint. If the setpoint is changed via a mobile application on one or more of user devices 8, the light may move on HVAC controller 30 to show the selected setpoint. An application of one of user devices 8 may enable a user to view one or more aspects of HVAC controller 30.

In some examples, if a Buoy water valve is installed, HVAC controller 30 may receive details on water usage and leak status. In some examples, if a security system is installed, HVAC controller 30 may control the security system.

Figure 2:
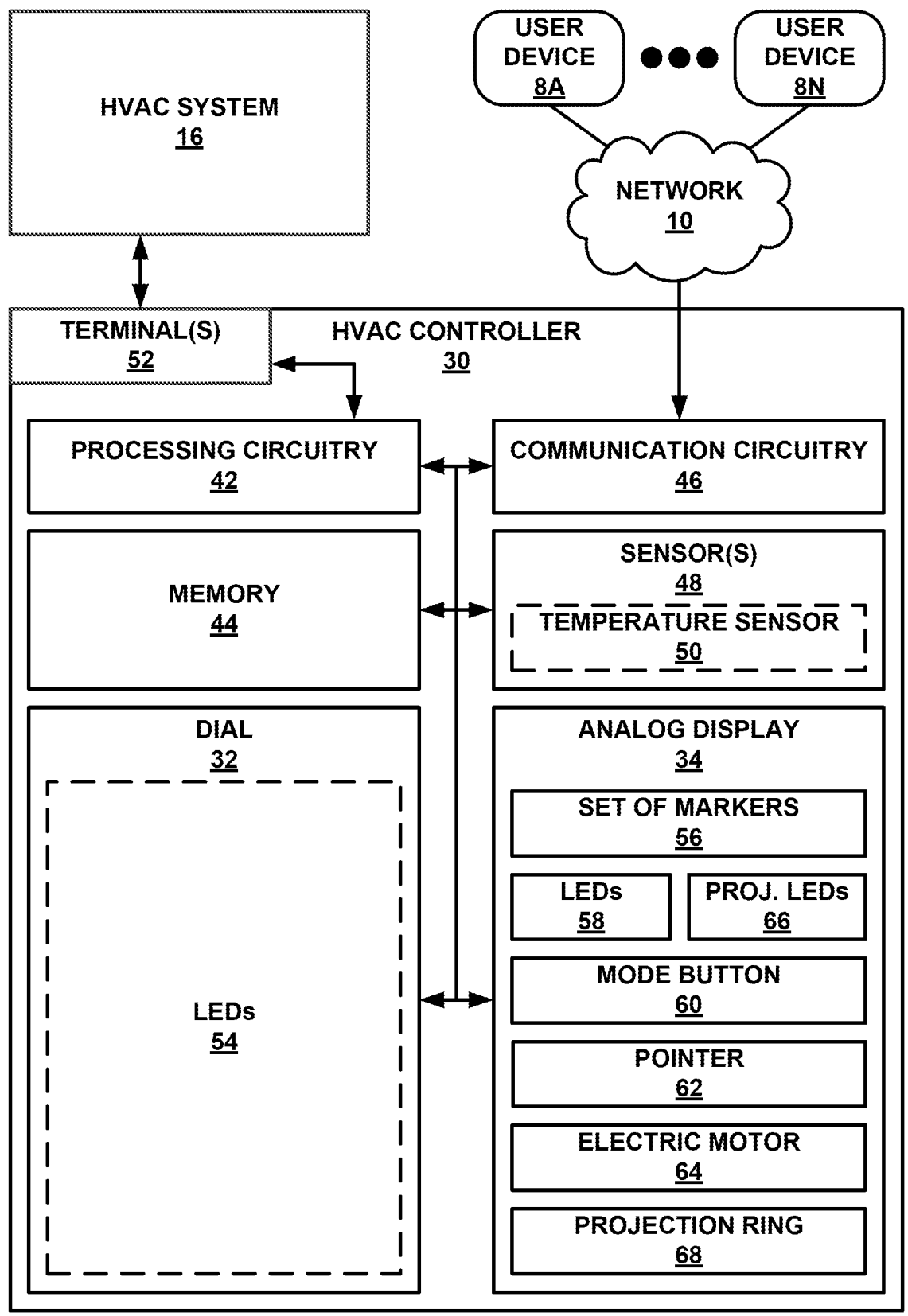
FIG. 2 is a block diagram illustrating an example HVAC controller including a dial and an analog display, in accordance with one or more techniques described herein.

FIG. 2 is a block diagram illustrating an example HVAC controller 30 including a dial 32 and an analog display 34, in accordance with one or more techniques described herein. As seen in FIG. 2, HVAC controller 30 includes processing circuitry 42, memory 44, communication circuitry 46, sensor(s) 48, and terminal(s) 52. Sensor(s) 48 may, in some examples, include a temperature sensor 50. In some examples, dial 32 includes LEDs 54. Analog display 34 includes markers 56, LEDs 58, mode button 60, pointer 62, and electric motor 64. In HVAC controller 30 may be configured to communicate with HVAC system 10 via terminal(s) 52 and/or communicate with user devices 8A-8N (collectively, "user devices 8") via network 6.

HVAC controller 30 may be configured to control HVAC system 10 in order to regulate one or more parameters of a space (e.g., a building, one or more rooms within a building, a large vehicle, or a vessel). In some examples, HVAC controller 30 regulates a temperature within the space. HVAC controller 30 may regulate the temperature of the space by using HVAC system 10 to decrease a temperature of the space if the current temperature of the space is greater than a first set point temperature and/or increase a temperature of the space using HVAC system 10 if the current temperature of the space is less than a second set point temperature. In some examples, the first set point temperature (e.g., a cooling set point temperature) is less than the second set point temperature (e.g., a heating set point temperature). In some examples, the first set point temperature is equal to the second set point temperature.

Processing circuitry 42 may include fixed function circuitry and/or programmable processing circuitry. Processing circuitry 42 may include any one or more of a microprocessor, a controller, a DSP, an ASIC, an FPGA, or equivalent discrete or analog logic circuitry. In some examples, processing circuitry 42 may include multiple components, such as any combination of one or more microprocessors, one or more controllers, one or more DSPs, one or more ASICs, or one or more FPGAs, as well as other discrete or integrated logic circuitry. The functions attributed to processing circuitry 42 herein may be embodied as software, firmware, hardware or any combination thereof.

In some examples, memory 44 includes computer-readable instructions that, when executed by processing circuitry 42, cause HVAC controller 30 and processing circuitry 42 to perform various functions attributed to HVAC controller 30 and processing circuitry 42 herein. Memory 44 may include any volatile, non-volatile, magnetic, optical, or electrical media, such as, for example, RAM, DRAM, SRAM, magnetic discs, optical discs, flash memories, or forms of EPROM or EEPROM. In some examples, the memory is used to store program instructions for execution by the processing circuitry of HVAC controller 30.

Communication circuitry 46 may include any suitable hardware, firmware, software or any combination thereof for communicating with another device, such as user devices 8 or other devices. Under the control of processing circuitry 42, communication circuitry 46 may receive downlink telemetry from, as well as send uplink telemetry to, one of user devices 8 or another device with the aid of an internal or external antenna. Communication circuitry 46 may include a Bluetooth transmitter and receiver, a Wi-Fi transmitter and receiver, a Zigbee transceiver, a near-field communication transceiver, or other circuitry configured to allow HVAC controller 30 to communicate with one or more remote devices such as user devices 8. In some examples, communication circuitry 46 may allow HVAC controller 30 to exchange data with external computing device 123 of FIG. 1. Examples of exchanged data include a desired temperature for the space, one or more control parameters for HVAC system 10, error codes, geographic location, estimated energy usage and cost, and/or other operating parameters or system performance characteristics for HVAC system 10.

In some examples, HVAC controller 30 includes one or more sensor(s) 48 including temperature sensor 50. In some examples, temperature sensor 50 is located within a housing of HVAC controller 30. In some examples, temperature sensor 50 is located remotely from HVAC controller 30 and may communicate with HVAC controller 30 via communication circuitry 46. For example, temperature sensor 50 may be located in the same room or the same area as HVAC controller 30 while being separate from HVAC controller 30 such that heat generated from components of HVAC controller 30 does not affect a temperature signal generated by temperature sensor 50. It may be beneficial for temperature sensor 50 to be located separately from HVAC controller 30 in order to obtain an accurate temperature reading. In some examples where temperature sensor 50 is located within the housing of HVAC controller 30, HVAC controller 30 may prevent components from affecting a temperature signal generated by temperature sensor 50. In some examples, at least a portion of the housing of HVAC controller 30 may include stainless steel and the housing may be coated with a material which hides fingerprints. In some examples, the term "housing" may be used herein to describe an outer surface of HVAC controller 30, including on outer surface of dial 32, an outer surface of analog display 34, and an outer face of HVAC controller 30 which is fixed to a wall or another surface.

In some examples, a housing of HVAC controller 30 may be substantially cylindrical in shape, and dial 32 may represent a ring-shaped piece that is located at an outer circumference of HVAC controller 30. In some examples, HVAC controller 30 includes a first face configured to be mounted on a plate which is fixed to a wall or another surface, a second face including a display, and a third face representing a side of HVAC controller 30, the third face extending around a circumference of HVAC controller 30. Dial 32 may include the third face of HVAC controller 30. In some examples, dial 32 is configured to rotate with respect to one or more other components of HVAC controller 30. For example, dial 32 is configured to rotate with respect to analog display 34. In some examples, dial 32 is configured to rotate in response to a user input. Dial 32 may be electrically connected to dial circuitry (not illustrated in FIG. 2) which may generate an electrical signal indicative of one or more rotational parameters (e.g., a rotational position, a rotational velocity, and/or a rotational acceleration) of dial 32. The dial circuitry may output the electrical signal indicative of the one or more rotational parameters to processing circuitry 42. In some examples, the dial circuitry is part of processing circuitry 42.

Processing circuitry 42 may be configured to set and/or change one or more temperature set points corresponding to the space in which HVAC controller 30 regulates temperature. For example, a first set point temperature may represent a cooling set point temperature and a second set point temperature may represent a heating set point temperature. In some examples, if HVAC controller 30 is cooling and the current temperature is greater than the cooling set point temperature, processing circuitry 42 may control HVAC system 10 to regulate the temperature in the space to approach the cooling set point temperature over a period of time based on the current temperature and the cooling set point temperature. In some examples, if HVAC controller 30 heating and the current temperature is less than the heating set point temperature, processing circuitry 42 may control HVAC system 10 to regulate the temperature in the space to approach the heating set point temperature over a period of time based on the current temperature and the heating set point temperature.

In some example, processing circuitry 42 is configured to receive an instruction to change and/or set one or more temperature set points of HVAC controller 30 from dial circuitry electrically connected to dial 32, where the instruction is indicative of a user selection of one or more temperature set points using dial 32. For example, in response to a first rotation of dial 32, processing circuitry 42 may set the cooling temperature set point value to a first temperature value if a cooling set point mode of HVAC controller 30 is activated. In some examples, HVAC controller 30 includes a mode button (not illustrated in FIG. 2) electrically connected to processing circuitry 42 which is configured to generate a signal based on a user request to switch a set point mode between the cooling set point mode and a heating set point mode. In response to a second rotation of dial 32, processing circuitry 42 may set the heating temperature set point value to a second temperature value if a heating set point mode of HVAC controller 30 is activated. In some examples, processing circuitry 42 is configured to receive an instruction to change and/or set one or more temperature set points of HVAC controller 30 from one or more of user devices 8 via network 6. Processing circuitry 42 may change the one or more temperature set points based on such an instruction.

In some examples, dial 32 includes LEDs 54. LEDs 54 may be, in some cases, a part of dial 32. In some examples, each LED of LEDs 54 may be configured to output an optical signal. LEDs 54 may be arranged in an array around the circumference of dial 32 such that the optical signal output by each LED of LEDs 54 is emitted outwards from a face of HVAC controller 30 which includes analog display 34. In some examples, processing circuitry 42 is configured to cause at least some of LEDs 54 to output an optical signal of a first color when HVAC controller 30 is in a heating set point mode and the current temperature is lower than the heating set point temperature. In some examples, processing circuitry 42 is configured to cause at least some of LEDs 54 to output an optical signal of a second color when HVAC controller 30 is in a cooling set point mode and the current temperature is greater than the cooling set point temperature. In some examples, the first color is red, and the second color is blue, but this is not required. Each of the first color and the second color may represent any visible wavelength of light.

In some examples, analog display 34 includes LEDs 58. In some examples, processing circuitry 42 is configured to selectively activate LEDs 58 in order to selectively illuminate one or more of the markers 56. In some examples, processing circuitry 42 selectively illuminates one or more of the set of markers in order to indicate one or more temperature set points (e.g., the cooling set point and/or the heating set point). In some examples, HVAC controller 30 includes LEDs 58 instead of LEDs 54. In some examples, HVAC controller 30 includes both of LEDs 54 and LEDs 58. LEDs 58 may be located behind a surface of analog display 34 which includes the markers 56. In some examples, LEDs 58 may emit optical signals which cause one or more of markers 56 to light up.

In some examples, markers 56 may include a set of temperature markers. The set of temperature markers may represent a range of temperatures. In some examples, the range of temperatures includes a lower-bound temperature and an upper-bound temperature. In some examples, the lower-bound temperature is 50 degrees Fahrenheit (° F.) and the upper-bound temperature is 90° F., but this is not required. The range of temperatures may include any range of temperatures. In some examples, each temperature marker of the set of temperature markers is in the shape of a dash, or a line. The set of temperature markers may be arranged in a semi-circular array the set of temperature markers are equally spaced apart. In some examples, markers 56 may include a set of numeric temperature indicators. Each numeric temperature indicator of the set of numeric temperature indicators may indicate a temperature associated with a respective temperature marker of the set of temperature markers.

In some examples, LEDs 58 may illuminate one or more of the set of temperature markers in order to indicate one or more temperature set points. For example, processing circuitry 42 may cause LEDs 58 to illuminate a first temperature marker of the set of temperature markers to indicate a first temperature set point and illuminate a second temperature marker of the set of temperature markers to indicate a second temperature set point. That is, the first temperature marker may by associated with a first temperature value corresponding to the first temperature set point, and the second temperature marker may by associated with a second temperature value corresponding to the second temperature set point. In some examples, processing circuitry 42 may cause LEDs 58 to change the temperature marker of the set of temperature markers that is illuminated to indicate the first temperature set point. In some examples, processing circuitry 42 may cause LEDs 58 to change the temperature marker of the set of temperature markers that is illuminated to indicate the second temperature set point.

In some examples, HVAC controller 30 may receive one or more inputs to mode button 60. For example, HVAC controller 30 may operate according to a first temperature set point mode and a second temperature set point mode. In some examples, when HVAC controller 30 receives an input to mode button 60, processing circuitry 42 may transition from operating according to the first temperature set point mode to operating according to the second temperature set point mode, or processing circuitry 42 may transition from operating according to the second temperature set point mode to operating according to the first temperature set point mode. When HVAC controller 30 is operating according to the first temperature set point mode, processing circuitry 42 may change a first temperature set point in response to receiving a user input to the dial 32, and when HVAC controller 30 is operating according to the second temperature set point mode, processing circuitry 42 may change a second temperature set point in response to receiving a user input to the dial 32.

For example, processing circuitry 42 may determine whether one or both of a cooling set point mode and a heating set point mode is activated. Processing circuitry 42 may receive a first rotation input to dial 32. When processing circuitry 42 determines that the cooling set point mode is activated, processing circuitry 42 may cause a cooling set point to change from a first cooling set point value to a second cooling set point value in response to receiving a first rotation input to dial 32. Processing circuitry may control LEDs 58 to transition from illuminating a first marker of the set of markers 56 to illuminating a second marker the set of markers 56, wherein the first marker corresponds to the first cooling set point value and the second marker corresponds to the second cooling set point value. When the first cooling set point value is greater than a heating set point value, and when the second cooling set point value is greater than or equal to the heating set point value, processing circuitry 42 may cause the cooling set point to change from the first cooling set point value to the second cooling set point value without changing the heating set point value in response to receiving the first rotation input to dial 32.

Alternatively, when processing circuitry 42 determines that the heating set point mode is activated, processing circuitry 42 may cause a heating set point to change from a first heating set point value to a second heating set point value in response to receiving a first rotation input to dial 32. Processing circuitry may control LEDs 58 to transition from illuminating a first marker of the set of markers 56 to illuminating a second marker the set of markers 56, wherein the first marker corresponds to the first heating set point value and the second marker corresponds to the second heating set point value. When the first heating set point value is less than a cooling set point value, and when the second heating set point value is less than or equal to the cooling set point value, processing circuitry 42 may cause the heating set point to change from the first heating set point value to the second heating set point value without changing the cooling set point in response to receiving the first rotation input to dial 32.

In some examples, it may be beneficial for HVAC controller 30 to always maintain the heating set point to be less than or equal to the cooling set point. For example, if the HVAC controller 30 sets the heating set point to be greater than the cooling set point, the HVAC controller 30 may simultaneously attempt to heat building 12 and cool building 12 when the current temperature is between the heating set point and the cooling set point. Performing only one of heating and cooling is more energy efficient that performing both of heating and cooling at the same time. Consequently, it is beneficial for HVAC controller 30 to maintain the heating set point to be less than or equal to the cooling set point. Consequently, when processing circuitry 42 decreases the cooling set point to be lower than an initial heating set point value, processing circuitry 42 may also decrease the heating set point in unison with the cooling set point. Additionally, or alternatively, when processing circuitry 42 increases the heating set point to be greater than an initial cooling set point value, processing circuitry 42 may also increase the cooling set point in unison with the heating set point.

HVAC controller 30 may control LEDs 58 to indicate a change in the heating set point and/or a change in the cooling set point as the changes are happening. In one example, HVAC controller 30 may decrease the cooling set point by two degrees in response to receiving a rotation input to dial 32, and HVAC controller 30 may control LEDs 58 to show the cooling set point "move" across the set of markers 56. For example, as dial 32 is rotating, HVAC controller 30 may cause LEDs 58 to transition from illuminating a first marker of the set of markers 56 to illuminating a second marker of the set of markers 56, and HVAC controller 30 may cause LEDs 58 to transition from illuminating the second marker of the set of markers 56 to illuminating a third marker of the set of markers 56. The second marker is one degree lower than the first marker, and the third marker is one degree lower than the second marker. As such, a user may view the transition of the set point by observing the set of markers 56. In some examples, LEDs 58 cause an illuminated marker to blink when a set point is changing, but this is not required.

Pointer 62 may extend along a radius of analog display 34 and pointer 62 may be configured to rotate about a center point of analog display 34 such that pointer 62 "points" at one or more markers of the set of markers 56. In some examples, electric motor 64 may receive an electric signal from processing circuitry 42 which 54 causes electric motor 64 to place pointer 62 in order to indicate a current temperature of the space (e.g., an area within building 12) in which HVAC controller 30 is performing temperature regulation using HVAC components 16. In some examples, processing circuitry 42 receives a temperature signal from temperature sensor 50, the temperature signal indicating the current temperature of the space in real-time or near real-time. Processing circuitry 42 may cause electric motor 64 to place (e.g., rotate) the pointer 62 based on the temperature signal in order to indicate the current temperature by pointing pointer 62 at a marker of the set of markers 56 which corresponds to the current temperature. In this way, pointer 62 may point at a marker of the set of markers 56 to indicate the current temperature of space, and LEDs 58 may illuminate one or more markers of the set of markers 56 to indicate one or more respective temperature set points for controlling HVAC components 16 to regulate the temperature within the space.

In some examples, projection LEDs 66 project a halo onto analog display 34. For example, projection LEDs 66 may create a halo light ring as a cosmetic feature over analog display 34 of HVAC controller 30. In some examples, the halo may represent a radially fading halo which allows set of markers 56 to be visible along with the halo. For example, the radially fading halo may represent a circular light ring in which the light intensity decreases moving away from the center of the light ring. The light intensity lowest at the edge of the circular light ring, and the light intensity greatest closer to the center of the circular light ring. In some examples, the halo may appear in a translucent applique pattern and/or create an LCD display illusion.

In some examples, it may be beneficial to control projection LEDs 66 to emit light with enough energy so that a user can perceive information (e.g., markers 56 and pointer 62) when the room housing HVAC controller 30 is dark. To achieve this effect, HVAC controller 30 may control HVAC controller 30 to emit light from projection LEDs 66 such that the light reflects off projection ring 68 onto the surface of analog display 34.

In some examples, the projection LEDs 66 may include light sources located on a Printed Component Board (PCB) (not illustrated in FIG. 2) of HVAC controller 30. In some examples, projection LEDs 66 may be configured to project an optical signal at a 90° angle from the target surface, analog display 34. For example, projection LEDs 66 may be located within a housing of HVAC controller 30 and may project optical signals outwards from HVAC controller 30 perpendicular to analog display 34. HVAC controller 30 may include a projection ring 68 which is configured to reflect the optical signals emitted by projection LEDs 66 onto analog display 34 by reflecting over analog display 34. In some examples, the projection ring 68 may, for example, be a transparent plastic in a ring shape intended to create a halo light ring over a flat surface, such as analog display 34 of HVAC controller 30. Projection LEDs 66 may represent a set of LEDs that shine in an "upward" direction.

Optical signals may travel inside a lightguide of the projection ring 68 facing a rounding surface, making an approximately 90° turn of the light direction all around the device. In some examples, the "turn" of the light is less than 90° so that the light reflects downwards from the projection ring onto the surface of analog display 34. In some examples, the projection ring 68 may turn different photons at different angles so that light lands at various locations on the surface of analog display 34.

When the light comes from the projection ring 68, it shines over a white surface, reflecting the light towards to the observer. Additionally, the device uses a top plate as a light blocking in order to delimits the desired light halo, as shown in the attached presentation. Since the light distribution may be angularly uniform and radially decreasing, it may create an illusion of a solar eclipse in a desired color. Furthermore, light coming from the hole system may fill a second plastic in translucent red that acts as a pointer and it is used for a position indicator purposes. For example, projection LEDs 66 may illuminate pointer 62. This means that pointer 62 does not need a separate light source in order to illuminate, and pointer 62 may, for instance, always be illuminated in a red color, although the light ring is created in a different color. Projection ring 68 may include four locating pins.

Processing circuitry 42 may output an instruction causing the LEDs 66 to emit one or more optical signals to reflect off projection ring 44 onto analog display 34. The optical signal is a first color if a current temperature is lower than a set point temperature of the one or more set point temperatures. The optical signal may represent a second color if the current temperature is greater than the set point temperature of the one or more set point temperatures. For example, if the heating mode is activated when the current temperature is lower than the set point temperature, the halo may be red. Alternatively, if the cooling mode is activated when the current temperature is greater than the set point temperature, the halo may be blue.

Figure 3A:
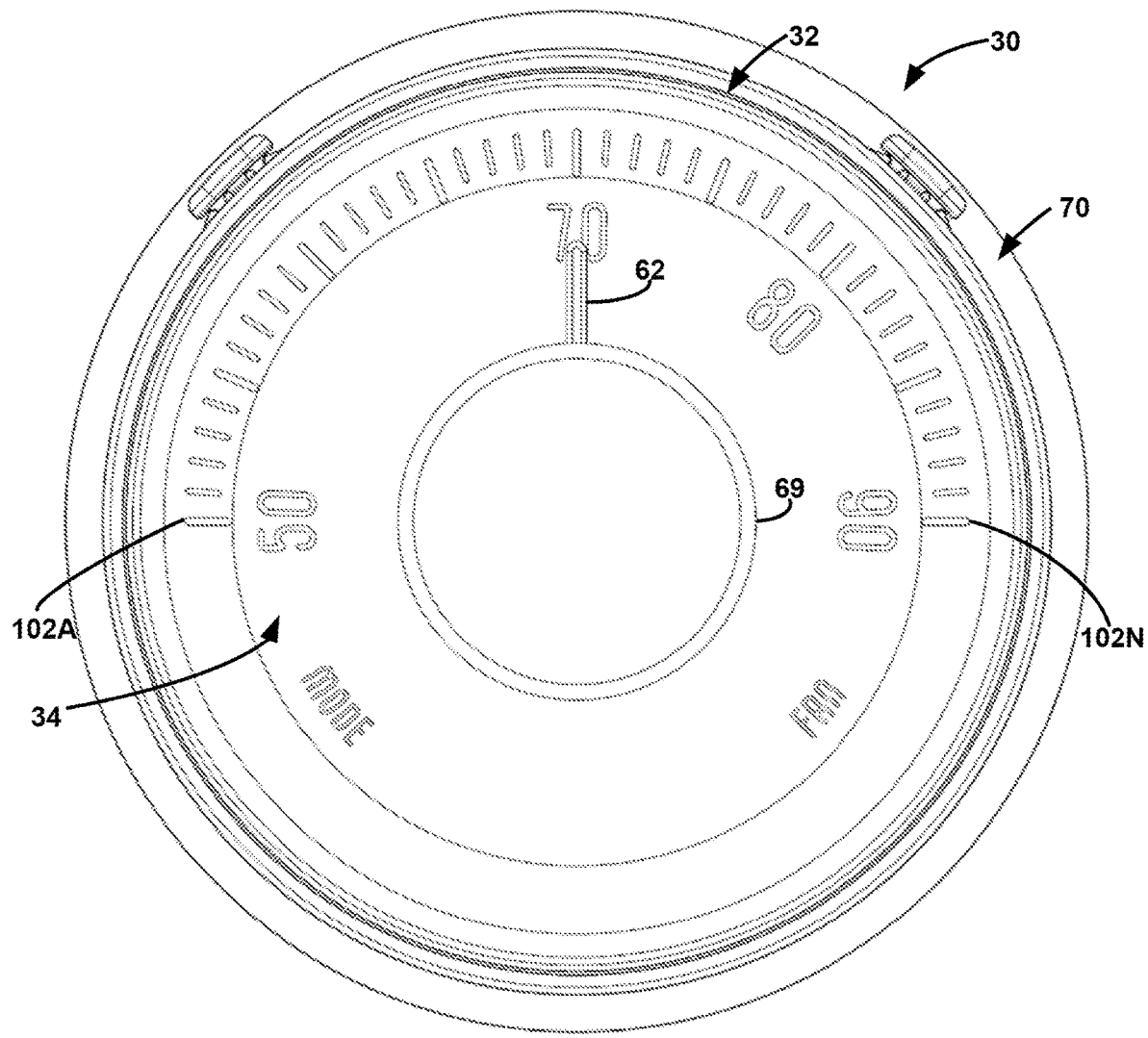
FIG. 3A is a conceptual diagram illustrating a front view of the HVAC controller of FIGS. 1-2, in accordance with one or more techniques described herein.

FIG. 3A is a conceptual diagram illustrating a front view of HVAC controller 30, in accordance with one or more techniques described herein. As seen in FIG. 3A, HVAC controller 30 includes dial 32, analog display 34, and wall plate 70. Analog display 34 includes pointer 62, top plate 69, and a set of markers 102A-102N (collectively, "set of markers 102").

In some examples, HVAC controller 30 includes one or more LEDs (e.g., LEDs 58 of FIG. 2) which may illuminate any one or combination of the set of markers 102 in order to indicate one or more parameter values of the range of parameter values displayed on the surface of analog display 34. Dial 32 may represent a rotatable dial which is located at an outer circumference of analog display 34. For example, dial 32 may rotate about a center of HVAC controller 30 while a surface of analog display 34 remains fixed in place. That is, when dial 32 rotates about the center of HVAC controller 30, the surface of analog display 34 and the wall plate 70 do not rotate. Dial 32 is configured to rotate clockwise and rotate counterclockwise. HVAC controller 30 may control one or more temperature set points based on rotation inputs to dial 32. For example, HVAC controller 30 may increase one or more temperature set points responsive to receiving a clockwise rotation input and HVAC controller 30 may decrease one or more temperature set points responsive to receiving a counterclockwise rotation input. HVAC controller 30 may control one or more other parameters based on rotation inputs to dial 32. For example, HVAC controller 30 may control one or more modes of operation, control one or more humidity set points, or control one or more other set points responsive to rotation inputs to dial 32.

In some examples, the LEDs of HVAC controller 30 may illuminate one or more markers of the set of markers 102 in order to indicate one or more temperature set points. For example, HVAC controller 30 may illuminate a first marker of the set of markers 102 to indicate a first temperature set point and HVAC controller 30 may illuminate a second marker of the set of markers 102 to indicate a second temperature set point. That is, the first marker may correspond to a first temperature value and the second marker may correspond to a second temperature value, where the first temperature set point is the first temperature value and the second temperature set point is the second temperature value. In some examples, the first temperature set point and the second temperature set point are at the same temperature value, and HVAC controller illuminates one marker of the set of markers 102 which corresponds to the temperature value of the first temperature set point and the second temperature set point. In some examples, HVAC controller 30 may indicate more than two temperature set points or indicate less than two temperature set points by illuminating one or more of markers 102.

One or more LEDs may project a ring of light onto a face of analog display 34 from wall plate 70. For example, at least some of the one or more LEDs may project light perpendicular to the face of analog display 34, and a reflective component beneath top plate 69 may reflect the light radially from underneath top plate 69 onto the surface of analog display 34. In this way, the light projected onto the surface of analog display 34 may be in the shape of a halo. As seen in FIG. 3A, the first marker 102A of the set of markers 102 corresponds to a first parameter value of a range of parameter values and the last marker 102N of the set of markers 102 corresponds to a last parameter value of the range of parameter values. In this example, the range of parameter values represents a range of temperatures extending from 50° F. to 90° F. However, this range is not meant to be limiting. Although in the example of FIG. 3A only a four parameter values (e.g., 50, 70, 80, and 90) are displayed, other parameter values are evident based on the relative placement of the parameter values on analog display 34. For example, the group of markers of the set of markers 34 corresponding to a sub-range of parameter values from 50° F. to 90° F. includes 11 markers. In this way, each marker corresponds to one parameter value and the marker preceding the last marker 102N corresponds to 89° F.

An electric motor (not illustrated in FIG. 3A) may be located underneath and/or proximate to top plate 69. The electric motor may be configured to move (e.g., rotate) pointer 62 such that pointer 62 indicates a parameter value of the range of parameter values shown on the face of analog display 34. In some examples, the rotation of pointer 62 is confined to an area of analog display 34 which includes the set of markers 102. For example, the electric motor may be configured to rotate pointer 62 within a 180 degree range from first marker 102A to second marker 102. In some examples, physical barriers (not illustrated in FIG. 3A) prevent the electric motor from rotating pointer 62 beyond first marker 102A or prevent the electric motor from rotating pointer 62 beyond the last marker 102N. In the example of FIG. 3A, pointer 62 indicates a marker of the set of markers 102 which corresponds to 70° F. In some examples, HVAC controller 30 controls pointer 62 to indicate a current temperature in a space which HVAC controller 30 regulates. As such, in the example of FIG. 3A, pointer 62 indicates that the current temperature in the space is 70°. HVAC controller 30 may determine a temperature of the space based on a signal received from a temperature sensor (e.g., temperature sensor 50 of FIG. 2). HVAC controller 30 may control the electric motor in order to rotate pointer 62 such that pointer 62 indicates the current temperature.

Figure 3B:
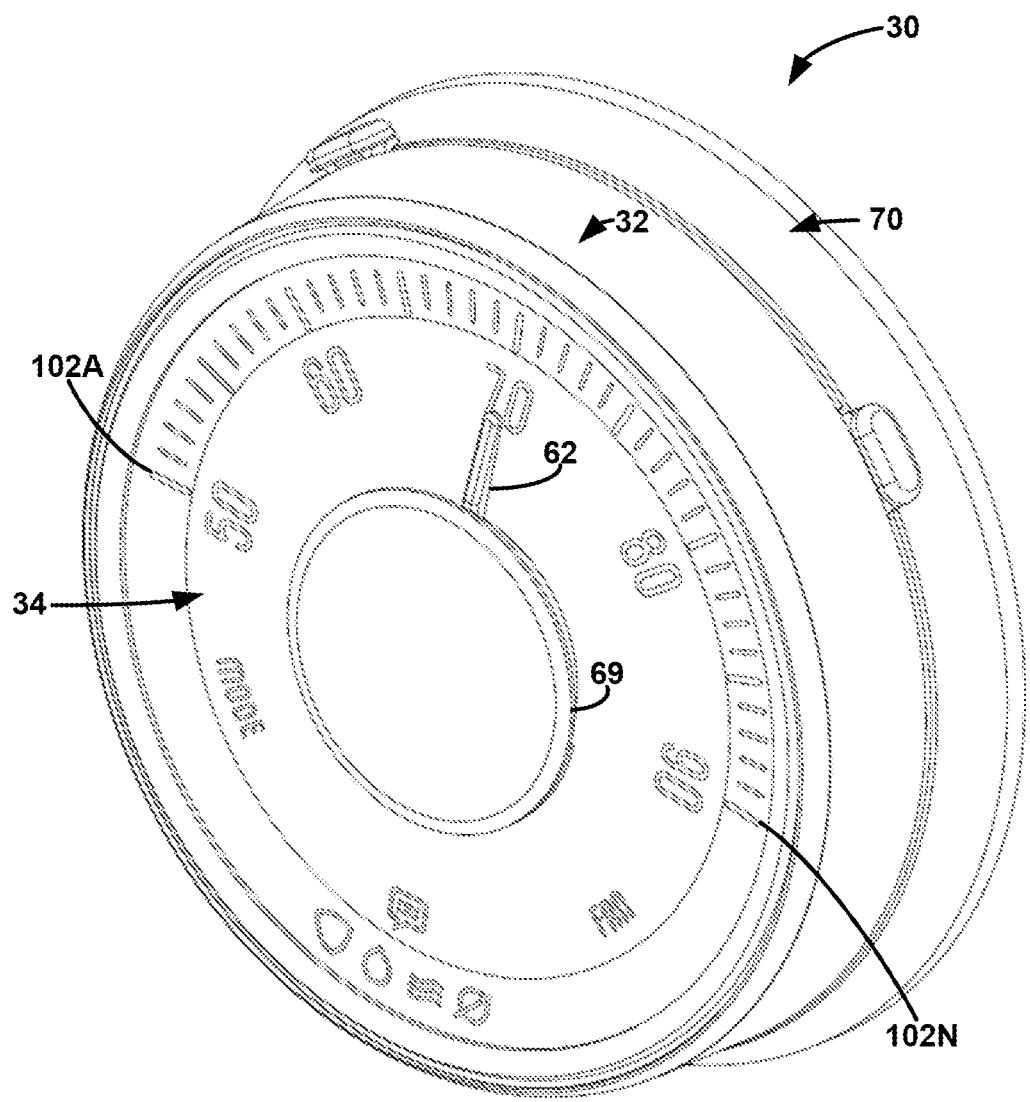
FIG. 3B is a conceptual diagram illustrating an example perspective view of the HVAC controller of FIGS. 1-2, in accordance with one or more techniques described herein.

FIG. 3B is a conceptual diagram illustrating an example perspective view of HVAC controller 30, in accordance with one or more techniques described herein. As seen in FIG. 3B, dial 32 is a round component which is located at an outer circumference of the analog display 34, which is also round. Wall plate 70 may be fixed to a wall or another surface. Analog display, dial 32, and other components of HVAC controller 30 may be fixed to wall plate 70 such that HVAC controller 30 is fixed to the wall or another surface. In some examples, wall plate 70 and analog display 34 are configured to remain fixed in one place, whereas dial 32 and pointer 62 are configured to rotate about a center of HVAC controller 30. At least a portion of controller 30 may be substantially cylindrical in shape, with a front face including analog display 34, a side face including dial 32 which is rotatable with respect to analog display 34, and a back face which is fixed to wall plate 70. The controller illustrated in FIGS. 3A-3B is one example of controller 30 of FIGS. 1-2, but controller 30 of FIGS. 3A-3B is not meant to be limited to the example of FIGS. 3A-3B. HVAC controller 30 may include other example controllers not illustrated in FIGS. 3A-3B.

Figure 4A:
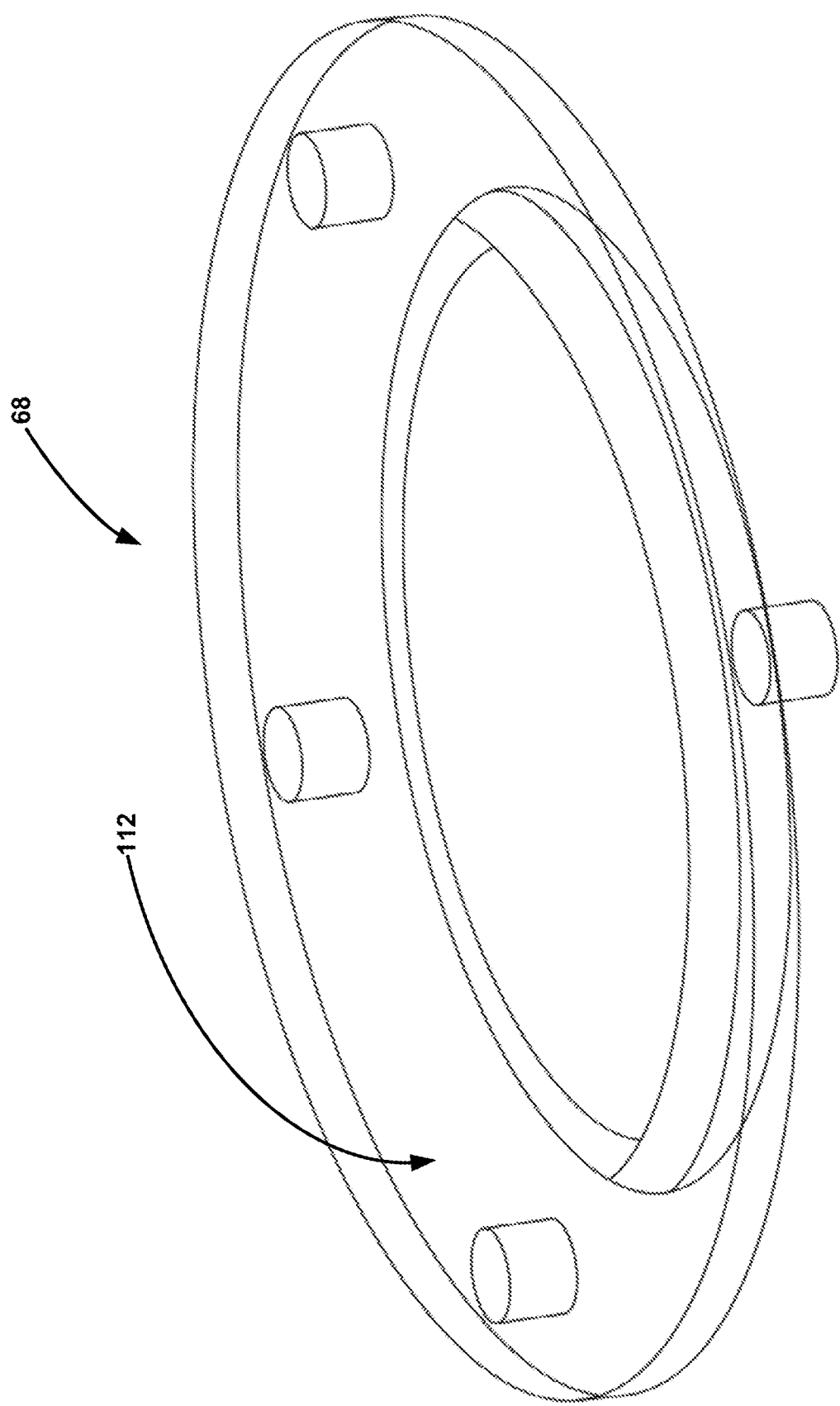
FIG. 4A is a conceptual diagram illustrating a perspective view of a projection ring of the HVAC controller of FIGS. 1-2, in accordance with one or more techniques described herein.

FIG. 4A is a conceptual diagram illustrating a perspective view of projection ring 68 of HVAC controller 30, in accordance with one or more techniques described herein. In some examples, projection ring 68 may be located underneath top plate 69 of FIGS. 3A-3B. As seen in FIG. 4A, projection ring 68 includes a rounded surface 112. The rounded surface may extend around a circumference of projection ring 68. Projection ring 68 may be circular in shape, such that projection ring 68 fits in a center of analog display 34 underneath top plate 69.

In some examples, projection ring 68 may be made of a waveguide material that is capable of bending and/or reflecting light. For example, light may enter projection ring 68 from a lower surface of projection ring 68, and the light may travel through projection ring 68 to the rounded surface of projection ring 68. The rounded surface may cause the light to reflect within projection ring 68. The light may exit the projection ring 68 from a side surface located at a circumference of projection ring 68. A canter of projection ring 68 may be located on a center axis that passes through a center of a surface of analog display 34 and a center of top plate 69.

Figure 4B:
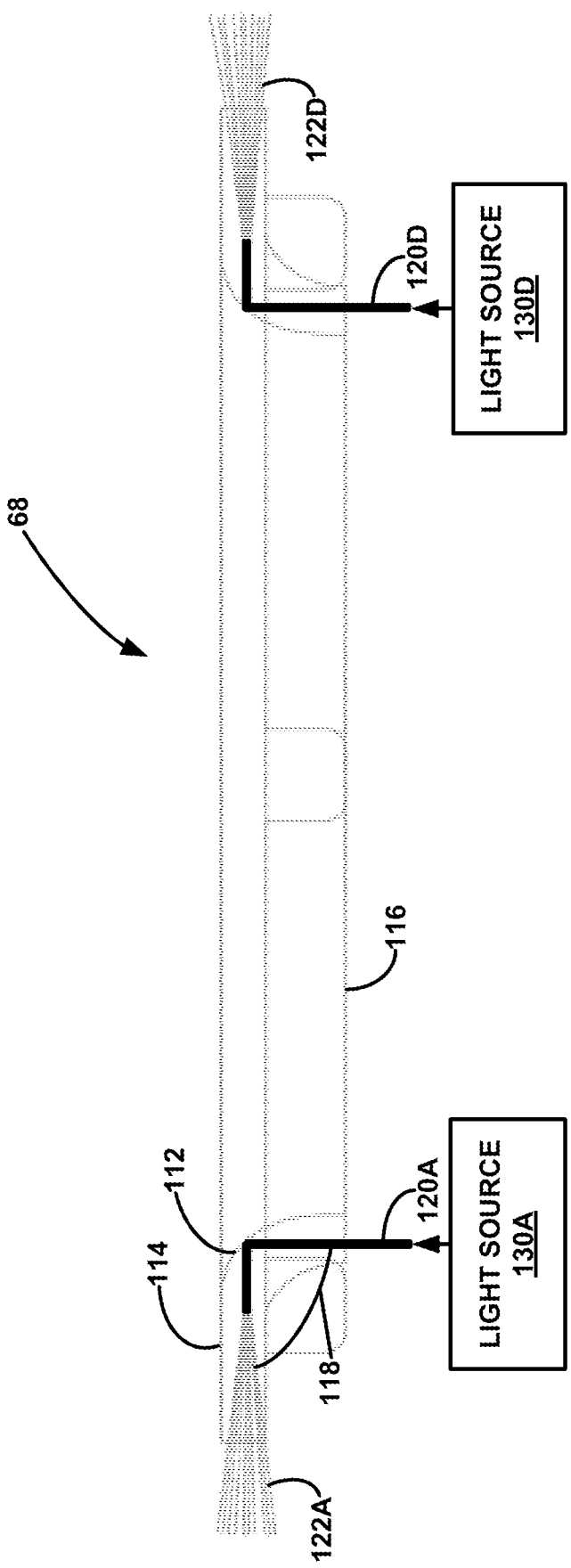
FIG. 4B is a conceptual diagram illustrating a side view of the projection ring of the HVAC controller of FIGS. 1-2, in accordance with one or more techniques described herein.

FIG. 4B is a conceptual diagram illustrating a side view of projection ring 68 of HVAC controller 30, in accordance with one or more techniques described herein. Projection ring 68 includes rounded surface 112, upper surface 114, and lower surface 116. Projection ring 68 is positioned such that upper surface 114 may face outwards from analog display 34, and lower surface 116 faces inwards towards circuitry of HVAC controller 30.

HVAC controller includes light sources 130A and 130D. Although only two light sources, i.e., light source 130A and light source 130D, are illustrated in FIG. 4B, HVAC controller 30 may include more than two light sources. Light source 130A emits light beam 120A and light source 130D emits light beam 120D. Light beam 120A and light beam 120D reflect off rounded surface 112. Reflected light beam 122A is the reflection of light beam 120A off rounded surface 112 and reflected light beam 122D is the reflection of light beam 120D off rounded surface 112. As illustrated in FIG. 4B, reflected light beam 122A is approximately perpendicular to light beam 120A, and reflected light beam 122D is approximately perpendicular to light beam 120D.

Reflected light beam 122A and 122D spread in a fan pattern, because rounded surface 112 causes the photons of light beams 120A and 120D to reflect at a range of angles. That is, some photons of light beam 120A reflect upwards away from upper surface 114 and some photons of light beam 120D reflect downwards towards lower surface 116. Photons that are reflected at less than 90° relative to the light beams 120A, 120D may travel downwards towards the surface of analog display 34. For example, projection ring 68 may "bend" some photons at angle 118, which is less than 90°. Photons that reflect at angle 118 may reflect off the surface of analog display 34 so that an observer can perceive light on the surface of analog display 34. Additionally, Photons that reflect at greater than angle 118 and less than 90° may also reflect off the surface of analog display 34 so that an observer can perceive light on the surface of analog display 34. Since analog display 34 reflects light at a range of angles, the light on the surface of analog display 34 may appear as a radially fading halo, where light intensity is greatest near an inner edge of the halo, and light intensity is lowest at an outer edge of the halo.

Each light source of light sources 130A, 130D may include one or more LEDs of projection LEDs 66. In some examples, light sources 130A, 130D may represent a single light source that emits more than one light beam.

Figure 4C:
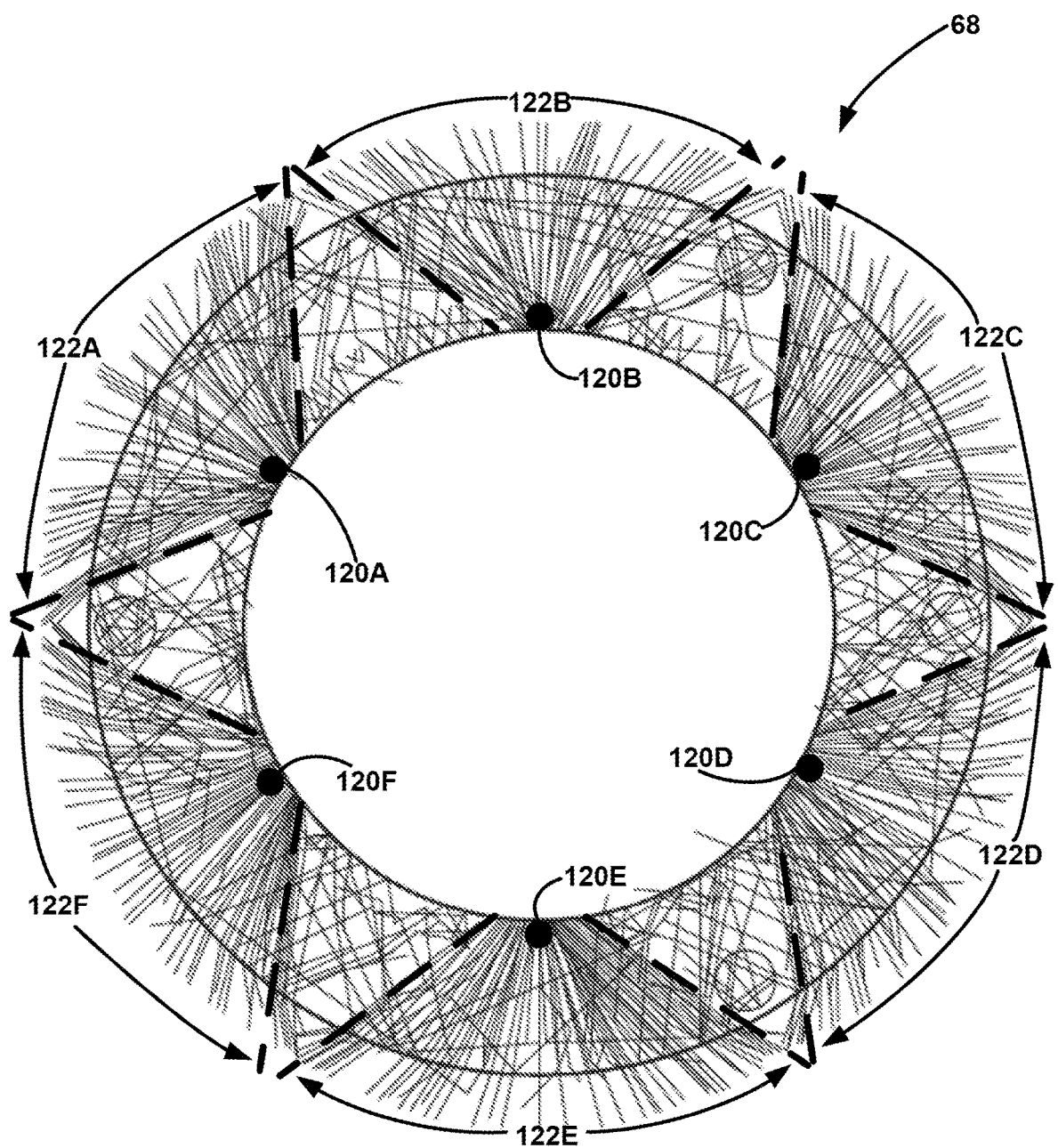
FIG. 4C is a conceptual diagram illustrating a top view of the projection ring of the HVAC controller of FIGS. 1-2, in accordance with one or more techniques described herein.

FIG. 4C is a conceptual diagram illustrating a top view of projection ring 68 of HVAC controller 30, in accordance with one or more techniques described herein. In the example of FIG. 4C, light beams 120A-120F (collectively, "light beams 120") reflect off of projection ring 68. For example, light beam 120A reflects off projection ring 68 to become reflected light beam 122A, light beam 120B reflects off projection ring 68 to become reflected light beam 122A, light beam 120C reflects off projection ring 68 to become reflected light beam 122C, and so on. Reflected light beams 122A-122F (collectively, "reflected light beams 122") are fan-shaped such that photons of reflected light beams 120 spread across a surface area of analog display 34.

Figure 5A:
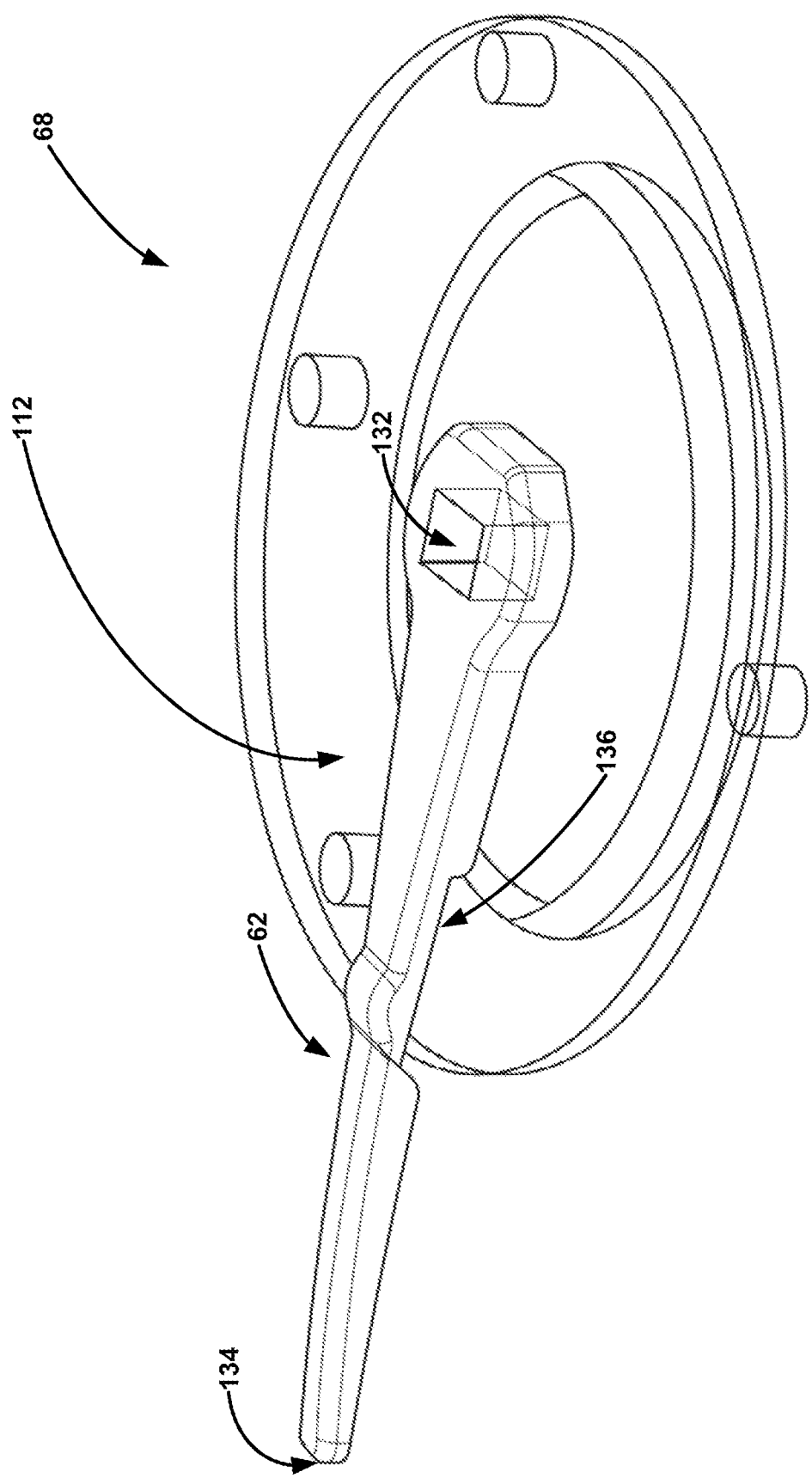
FIG. 5A is a conceptual diagram illustrating a perspective view of a pointer and a projection ring of the HVAC controller of FIGS. 1-2, in accordance with one or more techniques described herein.

FIG. 5A is a conceptual diagram illustrating a perspective view of pointer 62 and projection ring 68 of HVAC controller 30, in accordance with one or more techniques described herein. Pointer 62 includes a rotation point 132 and a distal point 134. Pointer 62 may rotate about rotation point 132. For example, HVAC controller 30 may control an electric motor to rotate pointer 62 such that pointer 62 indicates one or more markers of a set of markers. Pointer 62 is located on top of projection ring 68 such that pointer 62 can rotate about rotation point 132 while remaining on top of projection ring 68. For example, gap 136 in pointer 62 allows pointer 62 to fit on top of projection ring 68 such that pointer 62 can rotate about rotation point 132 while remaining on top of projection ring 68.

Figure 5B:
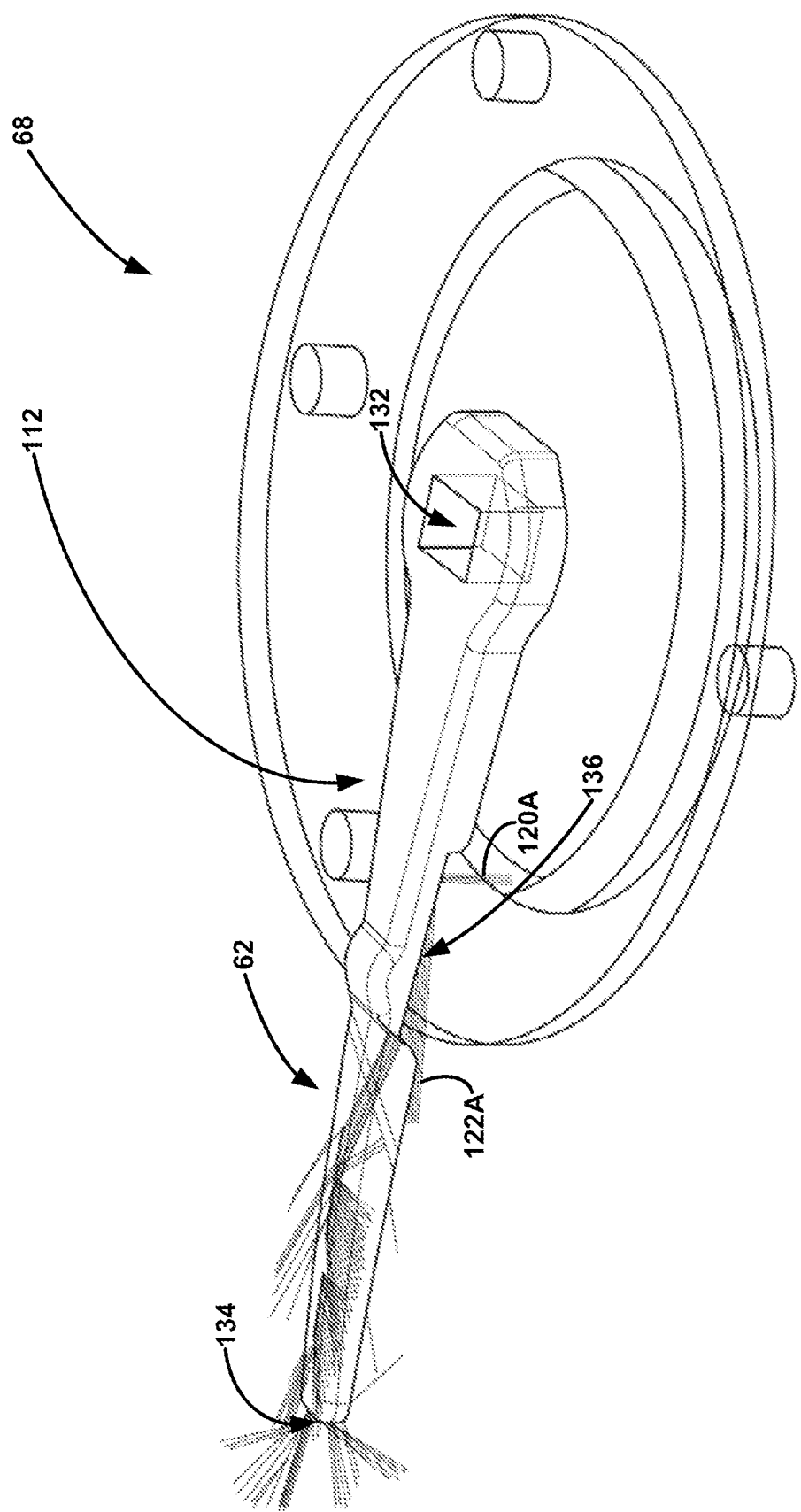
FIG. 5B is a conceptual diagram illustrating light reflecting off a pointer, in accordance with one or more techniques described herein.

FIG. 5B is a conceptual diagram illustrating light reflecting off pointer 62, in accordance with one or more techniques described herein. As seen in FIG. 5B, light beam 120A reflects off projection ring 68 to become reflected light beam 122A. Reflected light beam 122A then reflects through pointer 62, causing pointer 62 to illuminate when a light source is emitting light beam 120A. In this way, light beams reflecting off projection ring 68 may illuminate pointer 62 as well as cast a halo on the surface of analog display 34.

Figure 6A:
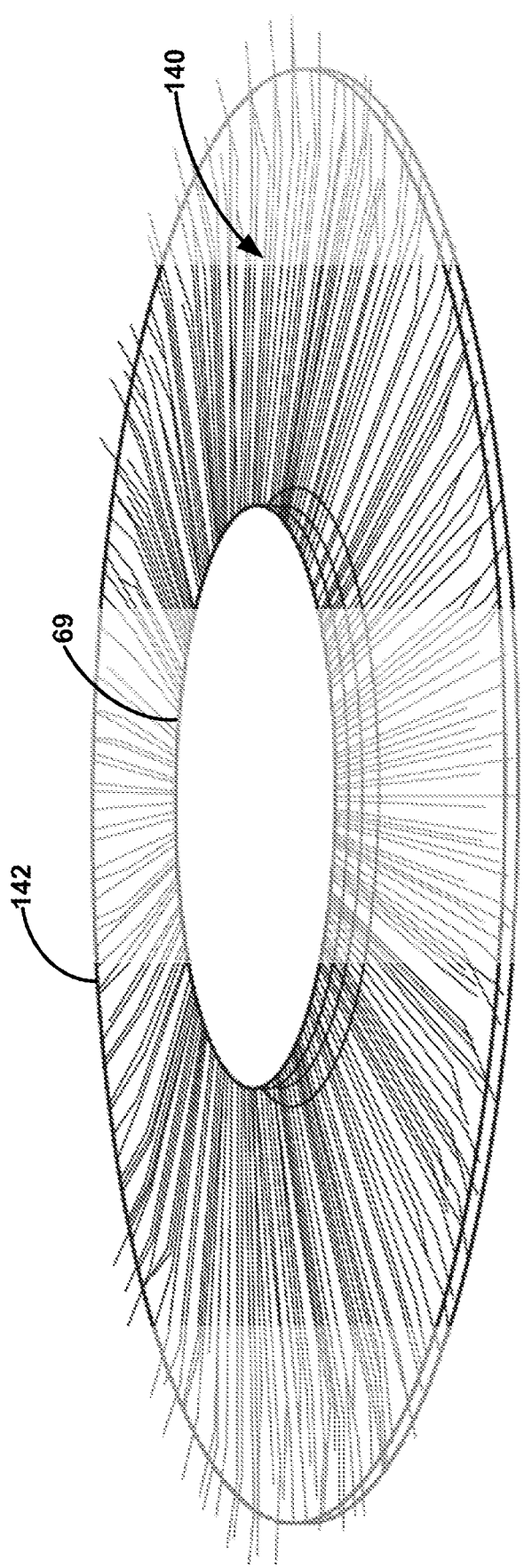
FIG. 6A is a conceptual diagram illustrating a perspective view of a light pattern on a surface, in accordance with one or more techniques described herein.
Figure 6B:
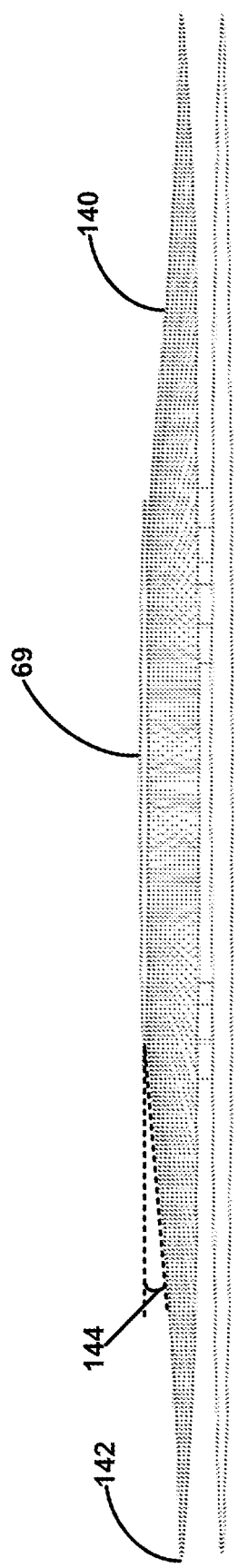
FIG. 6B is a conceptual diagram illustrating a side view of a light pattern on a surface, in accordance with one or more techniques described herein.
Figure 6C:
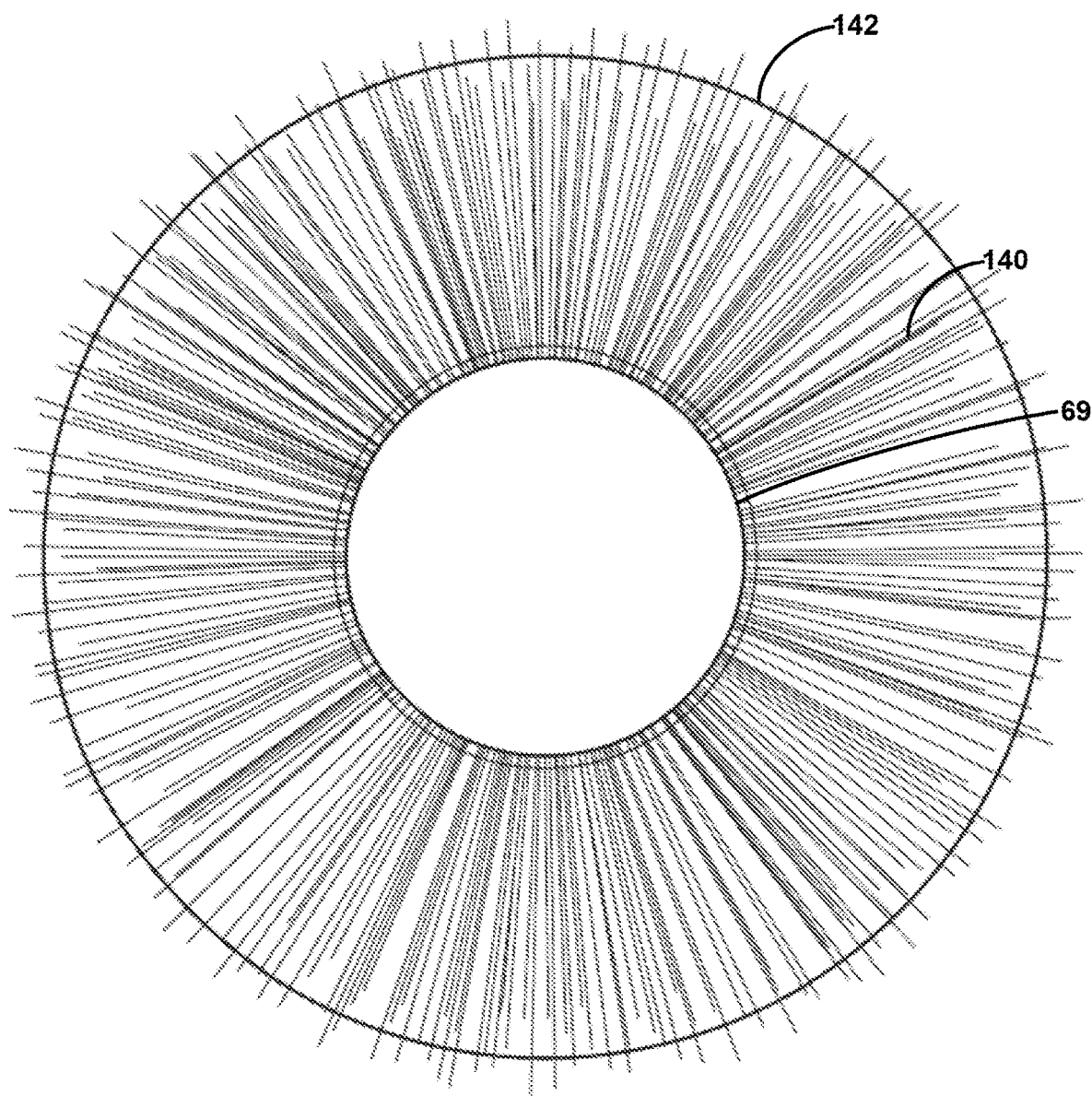
FIG. 6C is a conceptual diagram illustrating a top view of a light pattern on a surface, in accordance with one or more techniques described herein.

FIGS. 6A-6C illustrate views of a light pattern 140 on a surface 142. FIG. 6A is a conceptual diagram illustrating a perspective view of a light pattern 140 on a surface 142, in accordance with one or more techniques described herein. In some examples, surface 142 is an example of the surface of analog display 34 of FIGS. 1-3B. Light pattern 140 may spread outwards from a projection ring, which is located underneath top plate 69. Although FIG. 6A illustrates light pattern 140 extending to a boundary of surface 142, this is not required. In some examples, light pattern 140 may extend partly over a surface, but not the entire surface, such that light pattern 140 appears as a halo on the surface.

FIG. 6B is a conceptual diagram illustrating a side view of a light pattern 140 on a surface 142, in accordance with one or more techniques described herein. Top plate 69 is located above surface 142. light pattern 140 travels downwards from top plate 69 towards surface 142. In some examples, light pattern 140 travels from top plate 69 to surface 142 at angle 144. Since angle 144 is an angle with respect to surface 142, light pattern 140 may form a halo on surface 142. Since the light pattern 140 is angularly uniform and radially decreasing, it creates the illusion of a halo. FIG. 6C is a conceptual diagram illustrating a top view of a light pattern 140 on a surface 142, in accordance with one or more techniques described herein.

Figure 7:
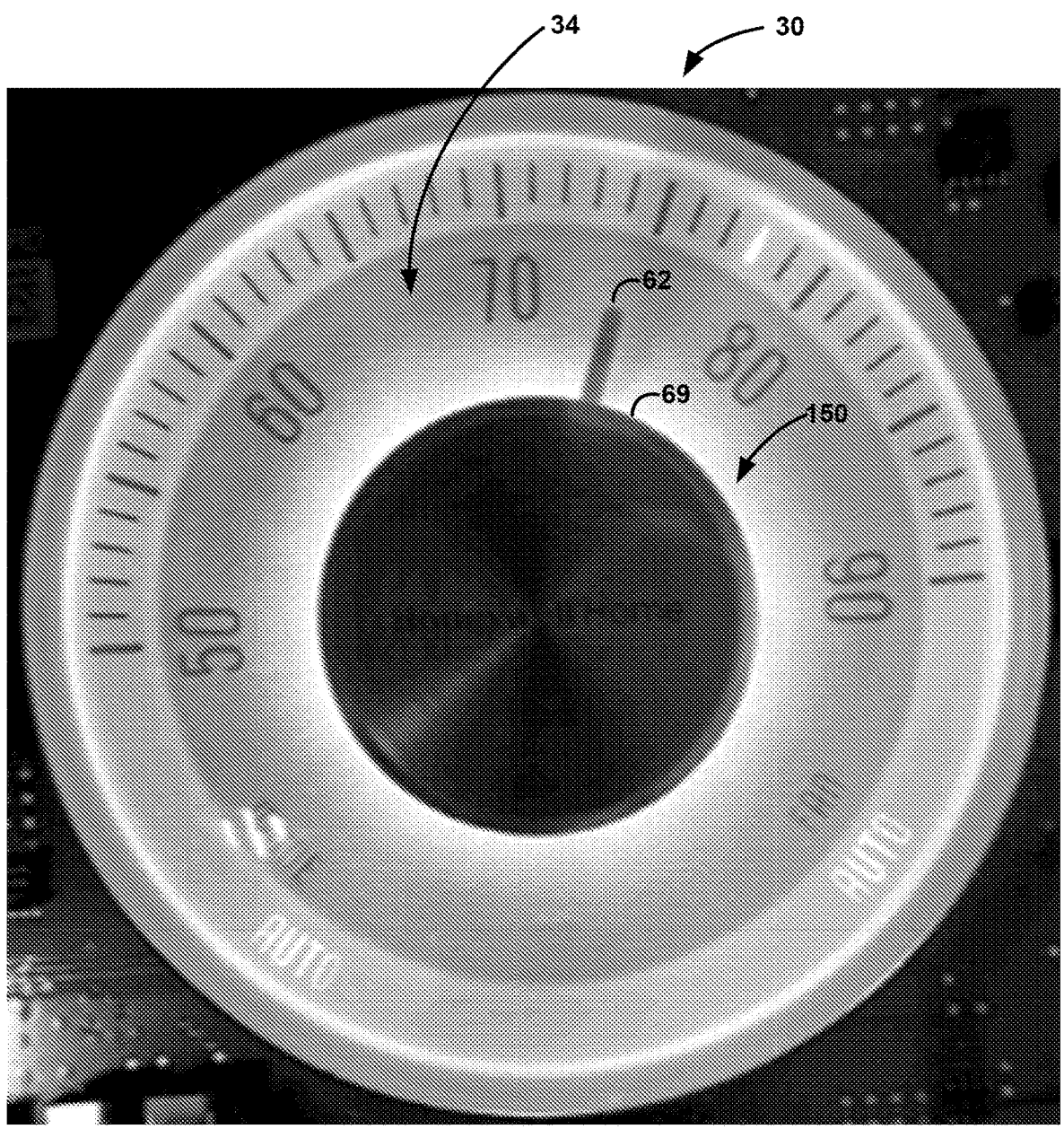
FIG. 7 is a conceptual diagram illustrating an example HVAC controller including a halo, in accordance with one or more techniques described herein.

FIG. 7 is a conceptual diagram illustrating an example HVAC controller 30 including halo 150, in accordance with one or more techniques described herein. Halo 150 may be an example of light pattern 140 in FIGS. 6A-6C. Although projection ring 68 is obscured by top plate 69 in the example of FIG. 7, halo 150, which is emitted by projection ring 68, is visible in an area surrounding top plate 69. As seen in FIG. 7, halo 150 fades radially away from top plate 69. In other words, halo 150 gets dimmer farther away from a center point of analog display 34. Pointer 62 is also illuminated in the example of FIG. 7.

Figure 8:
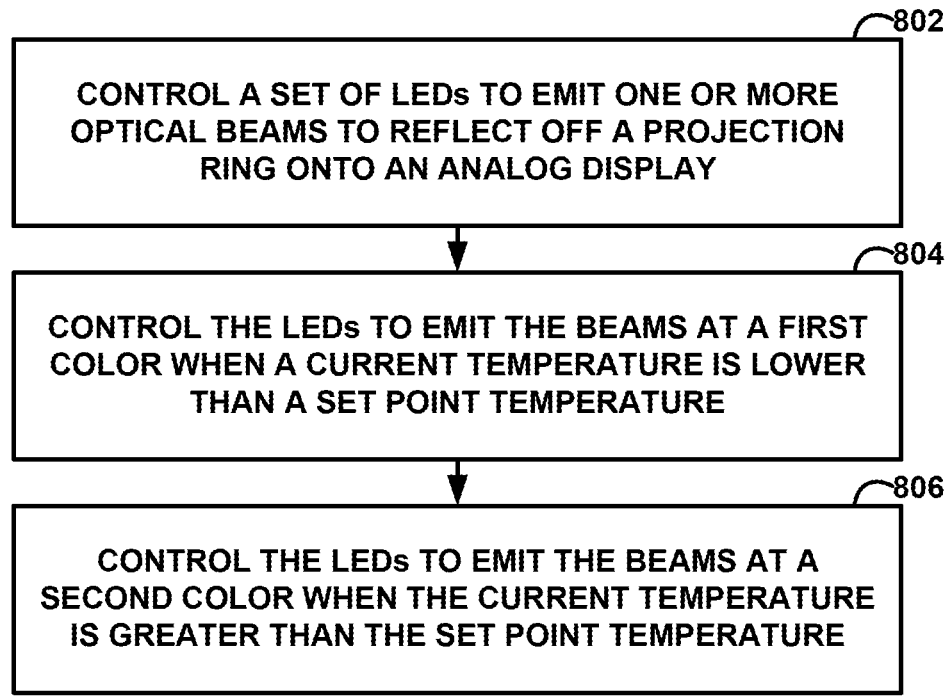
FIG. 8 is a flow diagram illustrating an example operation for projecting a light pattern on a surface of the HVAC controller of FIGS. 1-2, in accordance with one or more techniques described herein.

FIG. 8 is a flow diagram illustrating an example operation for projecting a light pattern on a surface of the HVAC controller 30 of FIGS. 1-2, in accordance with one or more techniques described herein. FIG. 8 is described with respect to HVAC controller 30 of FIGS. 1-2. However, the techniques of FIG. 8 may be performed by different components of HVAC controller 30 or by additional or alternative devices.

HVAC controller 30 may control projection LEDs 66 to emit one or more optical beams to reflect off a projection ring 68 onto an analog display 34 (802). In some examples, the one or more optical beams reflect downwards from the projection ring 68 onto the analog display 34 such that the one or more beams create a halo on analog display 34. HVAC controller 30 may control projection LEDs 66 to emit the one or more beams at a first color when a current temperature is lower than a set point temperature (804). In this example, the HVAC controller 30 may control HVAC component(s) 16 to increase the temperature within building 12, and HVAC controller 30 may control projection LEDs 66 to emit the one or more beams to be red, indicating that HVAC controller 30 is operating in a heating mode. HVAC controller 30 may control projection LEDs 66 to emit the one or more beams at a second color when a current temperature is greater than a set point temperature (806). In this example, the HVAC controller 30 may control HVAC component(s) 16 to decrease the temperature within building 12, and HVAC controller 30 may control projection LEDs 66 to emit the one or more beams to be blue, indicating that HVAC controller 30 is operating in a cooling mode.

The following examples are example systems, devices, and methods described herein.

Example 1: A device comprising: an analog display configured to indicate a current temperature and one or more temperature set points; a set of light-emitting diodes (LEDs); a projection ring; and processing circuitry, wherein the processing circuitry is configured to: control the set of LEDs to emit one or more optical beams to reflect off of the projection ring onto the analog display, wherein the one or more optical beams are a first color if the current temperature is lower than a set point temperature of the one or more set point temperatures, and wherein the one or more optical beams are a second color if the current temperature is greater than the set point temperature of the one or more set point temperatures.

Example 2: The device of example 1, wherein the analog display is circular in shape, wherein the projection ring is circular in shape, wherein a center axis passes through the center point of the projection ring and the center point of the analog display perpendicular to the analog display.

Example 3: The device of example 2, wherein the projection ring includes an upper surface, a lower surface, and a rounded surface, wherein the upper surface is perpendicular to the analog display, wherein the lower surface is perpendicular to the analog display, and wherein the rounded surface extends around a circumference of the projection ring between the upper surface and the lower surface.

Example 4: The device of example 3, wherein to control the set of LEDs to emit one or more optical beams to reflect off of the projection ring onto the analog display, the processing circuitry is configured to control the set of LEDs to emit one or more optical beams parallel to the center axis, the one or more optical beams reflecting off of the rounded surface onto the surface of the analog display.

Example 5: The device of example 4, wherein the one or more optical beams include six optical beams, and wherein each optical beam of the one or more optical beams reflects off of the rounded surface in a fan shape such that each beam spreads across a portion of a surface area of the analog display.

Example 6: The device of any of examples 3-5, wherein the analog display comprises: an electric motor; and a pointer connected to the electric motor, wherein the processing circuitry is configured to control the electric motor to rotate the pointer to rotate about the center axis, and wherein a bottom surface of the pointer covers the top surface of the projection ring.

Example 7: The device of example 6, wherein the analog display further comprises a set of markers, wherein the processing circuitry controls the pointer to indicate a marker of the set of markers, and wherein the marker corresponds to the current temperature.

Example 8: The device of any of examples 6-7, wherein the device further comprises a top plate, wherein the top plate covers the upper surface of the projection ring, and wherein the top plate covers a portion of the pointer.

Example 9: The device of any of examples 6-8, wherein at least one or more of the reflected optical beams illuminate the pointer.

Example 10: The device of any of examples 1-9, wherein the device further comprises a dial, and wherein the processing circuitry is configured to cause a temperature set point of the one or more temperature set points to change from a first set point value to a second set point value in response to receiving a first rotation input to the dial.

Example 11: A method comprising: indicating, by an analog display, a current temperature and one or more temperature set points; and controlling, by processing circuitry, a set of light-emitting diodes (LEDs) to emit one or more optical beams to reflect off of a projection ring onto the analog display, wherein the one or more optical beams are a first color if the current temperature is lower than a set point temperature of the one or more set point temperatures, and wherein the one or more optical beams are a second color if the current temperature is greater than the set point temperature of the one or more set point temperatures.

Example 12: The method of example 11, wherein the analog display is circular in shape, wherein the projection ring is circular in shape, wherein a center axis passes through the center point of the projection ring and the center point of the analog display perpendicular to the analog display.

Example 13: The method of example 12, wherein the projection ring includes an upper surface, a lower surface, and a rounded surface, wherein the upper surface is perpendicular to the analog display, wherein the lower surface is perpendicular to the analog display, and wherein the rounded surface extends around a circumference of the projection ring between the upper surface and the lower surface.

Example 14: The method of example 13, wherein controlling the set of LEDs to emit one or more optical beams to reflect off of the projection ring onto the analog display comprises controlling the set of LEDs to emit one or more optical beams parallel to the center axis, the one or more optical beams reflecting off of the rounded surface onto the surface of the analog display.

Example 15: The method of example 14, wherein the one or more optical beams include six optical beams, and wherein each optical beam of the one or more optical beams reflects off of the rounded surface in a fan shape such that each beam spreads across a portion of a surface area of the analog display.

Example 16: The method of any of examples 13-15, wherein the analog display includes an electric motor and a pointer connected to the electric motor, wherein the method further comprises controlling, by the processing circuitry, the electric motor to rotate the pointer to rotate about the center axis, wherein a bottom surface of the pointer covers the top surface of the projection ring.

Example 17: The method of example 16, wherein the analog display further comprises a set of markers, wherein the method further comprises controlling the pointer to indicate a marker of the set of markers, and wherein the marker corresponds to the current temperature.

Example 18: The method of any of examples 16-17, wherein the device further comprises a top plate, wherein the top plate covers the upper surface of the projection ring, and wherein the top plate covers a portion of the pointer.

Example 19: The method of any of examples 16-18, wherein at least one or more of the reflected optical beams illuminate the pointer.

Example 20: A device comprising: an analog display configured to indicate a current temperature and one or more temperature set points; and processing circuitry, wherein the processing circuitry is configured to: control a set of light-emitting diodes (LEDs) to emit one or more optical beams to reflect off of a projection ring onto the analog display, wherein the one or more optical beams are a first color if the current temperature is lower than a set point temperature of the one or more set point temperatures, and wherein the one or more optical beams are a second color if the current temperature is greater than the set point temperature of the one or more set point temperatures.

Example 21: A device comprising: an analog display configured to indicate a current temperature and one or more set point temperatures; a set of light-emitting diodes (LEDs);

a projection ring; and processing circuitry, wherein the processing circuitry is configured to: output an instruction causing the set of LEDs to emit one or more optical signals to reflect off of the projection ring onto the analog display, wherein the optical signal is a first color if the set point temperature is lower than a set point temperature of the one or more set point temperatures, and wherein the optical signal is a second color if the set point temperature is greater than the set point temperature of the one or more set point temperatures.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor" or "processing circuitry," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A device comprising:
an analog display configured to indicate a current temperature and one or more temperature set points;
a set of light-emitting diodes (LEDs);
a projection ring; and
processing circuitry, wherein the processing circuitry is configured to:
control the set of LEDs to emit one or more optical beams to reflect off of the projection ring onto the analog display,
wherein the one or more optical beams are a first color if the current temperature is lower than a set point temperature of the one or more set point temperatures, and
wherein the one or more optical beams are a second color if the current temperature is greater than the set point temperature of the one or more set point temperatures.

2. The device of claim 1, wherein the analog display is circular in shape, wherein the projection ring is circular in shape, wherein a center axis passes through the center point of the projection ring and the center point of the analog display perpendicular to the analog display.

3. The device of claim 2, wherein the projection ring includes an upper surface, a lower surface, and a rounded surface, wherein the upper surface is perpendicular to the analog display, wherein the lower surface is perpendicular to the analog display, and wherein the rounded surface extends around a circumference of the projection ring between the upper surface and the lower surface.

4. The device of claim 3, wherein to control the set of LEDs to emit one or more optical beams to reflect off of the projection ring onto the analog display, the processing circuitry is configured to control the set of LEDs to emit one or more optical beams parallel to the center axis, the one or more optical beams reflecting off of the rounded surface onto the surface of the analog display.

5. The device of claim 4, wherein the one or more optical beams include six optical beams, and wherein each optical beam of the one or more optical beams reflects off of the rounded surface in a fan shape such that each beam spreads across a portion of a surface area of the analog display.

6. The device of claim 3, wherein the analog display comprises:
an electric motor; and
a pointer connected to the electric motor, wherein the processing circuitry is configured to control the electric motor to rotate the pointer to rotate about the center axis, and wherein a bottom surface of the pointer covers the top surface of the projection ring.

7. The device of claim 6, wherein the analog display further comprises a set of markers, wherein the processing circuitry controls the pointer to indicate a marker of the set of markers, and wherein the marker corresponds to the current temperature.

8. The device of claim 6, wherein the device further comprises a top plate, wherein the top plate covers the upper surface of the projection ring, and wherein the top plate covers a portion of the pointer.

9. The device of claim 6, wherein at least one or more of the reflected optical beams illuminate the pointer.

10. The device of claim 1, wherein the device further comprises a dial, and wherein the processing circuitry is configured to cause a temperature set point of the one or more temperature set points to change from a first set point value to a second set point value in response to receiving a first rotation input to the dial.

11. A method comprising:
indicating, by an analog display, a current temperature and one or more temperature set points; and
controlling, by processing circuitry, a set of light-emitting diodes (LEDs) to emit one or more optical beams to reflect off of a projection ring onto the analog display, wherein the one or more optical beams are a first color if the current temperature is lower than a set point temperature of the one or more set point temperatures, and wherein the one or more optical beams are a second color if the current temperature is greater than the set point temperature of the one or more set point temperatures.

12. The method of claim 11, wherein the analog display is circular in shape, wherein the projection ring is circular in shape, wherein a center axis passes through the center point of the projection ring and the center point of the analog display perpendicular to the analog display.

13. The method of claim 12, wherein the projection ring includes an upper surface, a lower surface, and a rounded surface, wherein the upper surface is perpendicular to the analog display, wherein the lower surface is perpendicular to the analog display, and wherein the rounded surface extends around a circumference of the projection ring between the upper surface and the lower surface.

14. The method of claim 13, wherein controlling the set of LEDs to emit one or more optical beams to reflect off of the projection ring onto the analog display comprises controlling the set of LEDs to emit one or more optical beams parallel to the center axis, the one or more optical beams reflecting off of the rounded surface onto the surface of the analog display.

15. The method of claim 14, wherein the one or more optical beams include six optical beams, and wherein each optical beam of the one or more optical beams reflects off of the rounded surface in a fan shape such that each beam spreads across a portion of a surface area of the analog display.

16. The method of claim 13, wherein the analog display includes an electric motor and a pointer connected to the electric motor, wherein the method further comprises controlling, by the processing circuitry, the electric motor to rotate the pointer to rotate about the center axis, wherein a bottom surface of the pointer covers the top surface of the projection ring.

17. The method of claim 16, wherein the analog display further comprises a set of markers, wherein the method further comprises controlling the pointer to indicate a marker of the set of markers, and wherein the marker corresponds to the current temperature.

18. The method of claim 16, wherein the device further comprises a top plate, wherein the top plate covers the upper surface of the projection ring, and wherein the top plate covers a portion of the pointer.

19. The method of claim 16, wherein at least one or more of the reflected optical beams illuminate the pointer.

20. A device comprising:
an analog display configured to indicate a current temperature and one or more temperature set points; and
processing circuitry, wherein the processing circuitry is configured to:
control a set of light-emitting diodes (LEDs) to emit one or more optical beams to reflect off of a projection ring onto the analog display,
wherein the one or more optical beams are a first color if the current temperature is lower than a set point temperature of the one or more set point temperatures, and
wherein the one or more optical beams are a second color if the current temperature is greater than the set point temperature of the one or more set point temperatures.

* * * * *

UNITED STATES PATENT AND TRADEMARK OFFICE
CERTIFICATE OF CORRECTION

| | | |
|---|---|---|
| PATENT NO. | : 12,305,871 B2 | Page 1 of 1 |
| APPLICATION NO. | : 17/756599 | |
| DATED | : May 20, 2025 | |
| INVENTOR(S) | : Ricardo Alonso Gonzalez et al. | |

It is certified that error appears in the above-identified patent and that said Letters Patent is hereby corrected as shown below:

On the Title Page

Item (57), Abstract, Line 3, after "temperature set" please INSERT --"points."--

Signed and Sealed this
Second Day of September, 2025

Coke Morgan Stewart
*Acting Director of the United States Patent and Trademark Office*